(12) United States Patent
Innan et al.

(10) Patent No.: US 7,398,363 B2
(45) Date of Patent: Jul. 8, 2008

(54) STORAGE SYSTEM AND POWER SOURCE CONTROL METHOD THEREOF, STORAGE APPARATUS AND DATA PROCESSING METHOD

(75) Inventors: Masataka Innan, Odawara (JP); Hideo Tabuchi, Odawara (JP); Akinobu Shimada, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 249 days.

(21) Appl. No.: 11/441,197

(22) Filed: May 26, 2006

(65) Prior Publication Data

US 2007/0233950 A1   Oct. 4, 2007

(30) Foreign Application Priority Data

Mar. 28, 2006   (JP) .............................. 2006-088865

(51) Int. Cl.
G06F 12/16 (2006.01)
G06F 1/32 (2006.01)

(52) U.S. Cl. ........................................ 711/161; 711/114
(58) Field of Classification Search ........................ None
See application file for complete search history.

(56) References Cited

U.S. PATENT DOCUMENTS

| | | | | |
|---|---|---|---|---|
| 4,020,466 | A * | 4/1977 | Cordi et al. .................. | 707/201 |
| 4,077,059 | A * | 2/1978 | Cordi et al. .................. | 711/122 |
| 6,829,688 | B2 * | 12/2004 | Grubbs et al. ................ | 711/162 |
| 6,947,240 | B2 | 9/2005 | Hakamata et al. | |
| 7,111,136 | B2 * | 9/2006 | Yamagami .................... | 711/162 |
| 7,162,601 | B2 * | 1/2007 | Yamagami .................... | 711/162 |
| 2004/0268067 | A1 * | 12/2004 | Yamagami .................... | 711/159 |
| 2006/0149909 | A1 * | 7/2006 | Yamagami .................... | 711/160 |
| 2006/0190692 | A1 * | 8/2006 | Yamagami .................... | 711/162 |
| 2007/0220221 | A1 * | 9/2007 | Yamagami .................... | 711/160 |
| 2007/0277012 | A1 * | 11/2007 | Hara et al. ..................... | 711/162 |

FOREIGN PATENT DOCUMENTS

JP   2000-293314   4/1999

* cited by examiner

*Primary Examiner*—Kevin Verbrugge
(74) *Attorney, Agent, or Firm*—Reed Smith LLP; Stanley P. Fisher, Esq.; Juan Carlos A. Marquez, Esq.

(57) ABSTRACT

Provided is a storage system and power supply control method thereof, storage apparatus and data processing method capable of reducing the power consumption of the overall storage system without requiring any complicated settings. A journal regarding update history information of a first volume in which a host system reads and writes data is created. The created journal is sequentially stored in a second volume or a first external storage apparatus, each of which serves as a storage destination of the journal. Power supply of a storage device providing an alternate second volume as the storage destination of the journal or an alternate first external storage apparatus as the storage destination of the journal is controlled according to the storage quantity of the journal in the second volume or the first external storage apparatus.

18 Claims, 15 Drawing Sheets

FIG.3

| # | STORAGE APPARATUS | LU# | VOLUME CAPACITY | JNL STORAGE QUANTITY | THRESHOLD VALUE | JNL IDENTIFYING INFORMATION (FIRST) | JNL IDENTIFYING INFORMATION (LAST) | STATUS INFORMATION | SNAPSHOT ACQUISITION INFORMATION |
|---|---|---|---|---|---|---|---|---|---|
| 0 | A | LU0 | XX[GB] | xx[GB] | 70% | HH/MM/SS | HH/MM/SS | Ready | ACQUIRED |
| 1 | B | LU1 | YY[GB] | yy[GB] | 80% | HH/MM/SS | HH/MM/SS | Not Ready | NOT ACQUIRED |
| . . . | . . . | . . . | . . . | . . . | . . . | . . . | . . . | . . . | . . . |
| 18A | 18B | 18C | 18D | 18E | 18F | 18G | 18H | 18I | 18J |

18

STORAGE SYSTEM AND POWER SOURCE CONTROL METHOD THEREOF, STORAGE APPARATUS AND DATA PROCESSING METHOD

CROSS-REFERENCES TO RELATED APPLICATIONS

This application relates to and claims priority from Japanese Patent Application No. 2006-088865, filed on Mar. 28, 2006, the entire disclosure of which is incorporated herein by reference.

BACKGROUND OF INVENTION

1. Field of the Invention

The present invention relates to a storage system and a method of controlling power supply of the same, storage apparatus and data processing method. In particular, the invention is suitably applied to a storage system capable of recovering data at an arbitrary point in time by using update history of data.

2. Background Art

In recent years, data protection technology enabling the recovery of data at an arbitrary point in time by using update history of data referred to as a journal is attracting attention.

With this data protection technology, it is necessary to store all journals in order to enable the recovery of data at an arbitrary point in time and, as a result, the storage quantity of journals will continually increase.

Once a journal is stored in the storage device, such journal is rarely accessed until it is used in recovering data. Nevertheless, the actual situation is that a storage device storing journals is constantly in an operating state so that it can store an acquired journal at all times.

Pursuant to the increase of data to be protected in the future, it is anticipated that the accumulation of journals will also increase. Thus, it is envisioned that a means for reducing costs in retaining journals, which are hardly accessed, will become even more necessary.

Under the foregoing circumstances, Japanese Patent Laid-Open Publication No. 2000-293314 (Patent Document 1) discloses technology for suppressing the power consumption of the overall disk array device by turning off the power of a magnetic disk device, or switching to the power saving mode of such magnetic disk device, belonging to RAID (Redundant Array of Inexpensive Disks) that has not been accessed for a certain period of time ("power saving waiting time").

SUMMARY OF INVENTION

According to the technology disclosed in Patent Document 1, it is necessary for the system administrator to set an appropriate "power saving waiting time." If the "power saving waiting time" is too long, the effect of suppressing power consumption will deteriorate since the disk array device will continue to operate even when there is no access request. In contrast, if the "power saving waiting time" is too short, power of the magnetic disk device will be frequently turned off or the magnetic disk device will be frequently switched to the power saving mode. Once the magnetic disk device is turned off or is switched to the power saving mode, several to several ten seconds are required for it to return to an accessible state. Thus, if the magnetic storage apparatus is frequently turned off or switched to the power saving mode, there is concern that this will have an adverse effect on the upper-level application or business.

Further, according to the technology disclosed in Patent Document 1, since the magnetic disk device will continue to operate during the "power saving waiting time" even when there is no access, it is not possible to suppress the power consumption during that time.

The present invention was made in view of the foregoing problems. Thus, an object of the present invention is to provide a storage system and power supply control method thereof, storage apparatus and data processing method capable of reducing the power consumption of the overall storage system without requiring any complicated settings.

In order to achieve the foregoing object, the present invention provides a storage system having a host system which serves as an upper-level system, and a storage apparatus operatively connected to the host system and configured to provide a first volume for reading and writing data from and to the host system. The storage apparatus includes a journal creation unit configured to create a journal as update history information of the first volume and a journal storage unit configured to store the journal created by the journal creation unit selectively in one of second volumes or one of first external storage apparatuses, each of which serves as a storage destination of the journal. The journal storage unit executes power supply control of a storage apparatus providing an alternate second volume as the storage destination of the journal or an alternate first external storage apparatus as the storage destination of the journal according to the storage quantity of the journal in the one of second volumes or the one of first external storage apparatuses.

Thus, in this storage system, the power supply of a storage device or first external storage apparatus to provide a second volume as a storage destination of a subsequent journal is controlled according to the storage quantity of journals in the second volume or first external storage apparatus. Accordingly, it is possible to operate such storage device or first external storage apparatus only when necessary.

Further, the present invention provides a method of controlling power supply of a storage system having a host system which serves as an upper-level system, and a storage apparatus providing a first volume for reading and writing data from and to the host system. Specifically, the method includes creating a journal regarding update history information of the first volume and storing the created journal selectively in one of second volumes or one of first external storage apparatuses, each of which serves as a storage destination of the journal. At the storing step, power supply control of the storage apparatus providing an alternate second volume as the storage destination of the journal or an alternate first external storage apparatus as the storage destination of the journal is executed according to the storage quantity of the journal in the one of second volumes or the one of first external storage apparatuses.

Thus, in this power supply control method, the power supply of a storage device or first external storage apparatus to provide a second volume as a storage destination of a subsequent journal is controlled according to the storage quantity of journals in the second volume or first external storage apparatus. Accordingly, it is possible to operate such storage device or first external storage apparatus only when necessary.

Moreover, the present invention provides a storage apparatus providing a first volume for reading and writing data from and to a host system which serves as an upper-level system. The storage apparatus includes a journal creation unit configured to create a journal as update history information of the first volume and a journal storage unit configured to store the journal created with the journal creation unit in one of second volumes or one of first external storage apparatuses, each of which serves as a storage destination of the journal. The journal storage unit executes power supply control of the storage apparatus providing an alternate second volume as the storage destination of the journal or an alternate first external storage apparatus as the storage destination of the journal according to the storage quantity of the journal in the one of second volumes or the one of first external storage apparatuses.

Thus, in this storage apparatus, the power supply of a storage device or first external storage apparatus to provide a second volume as a storage destination of a subsequent journal is controlled according to the storage quantity of journals in the second volume or first external storage apparatus. Accordingly, it is possible to operate such storage device or first external storage apparatus only when necessary.

In addition, the present invention provides a method of processing data in a storage system having a host system which serves as an upper-level system, and a storage apparatus providing a first volume for reading and writing data from and to the host system. Specifically, the method includes creating a journal as update history information of the first volume and storing the created journal in one of second volumes or one of first external storage apparatuses, each of which serves as a storage destination of the journal. At the storing step, the journal stored in the one of second volumes is migrated to a third volume or a second external storage apparatus according to the alternation of the storage destination of the journal to the alternate second volume or the alternate first external storage apparatus.

Thus, according to this data processing method, it is possible to migrate the journals stored in the second volume to a third volume or second external storage apparatus at a timing of switching the storage destination.

Further, the present invention provides a storage system having a host system which serves as an upper-level system, and a storage apparatus configured to provide a first volume for reading and writing data from and to the host system. The storage apparatus includes a journal creation unit configured to create a journal as update history information of the first volume; and a journal storage unit configured to store the journal created by the journal creation unit selectively in one of second volumes or one of first external storage apparatuses, each of which serves as a storage destination of the journal. The journal storage unit creates a snapshot formed from a data image of the first volume or commands the creation of the snapshot upon the alternation of the storage destination of the journal to the alternate second volume or alternate external storage apparatus.

Thus, in this storage system, it is possible to obtain a snapshot of a first volume at a timing of switching the storage destination of the journal.

Furthermore, the present invention provides a storage system having a host system which serves as an upper-level system, and a storage apparatus configured to provide a first volume for reading and writing data from and to the host system. The storage apparatus includes a journal creation unit configured to create a journal as update history information of the first volume and a journal storage unit configured to store the journal created with the journal creation unit in one of second volumes or one of first external storage apparatuses configured as a storage destination of the journal. The journal storage unit creates a snapshot formed from a data image of the first volume or commands the creation of the snapshot when the storage quantity of the journal exceeds a predetermined threshold value set to the one of second volumes or the one of first external storage apparatuses.

Thus, in this storage system, it is possible to obtain a first volume snapshot at a point when the storage quantity of journals exceeds the predetermined threshold value set to the second volume or first external storage apparatus.

According to the present invention, it is possible to operate the storage device or first external storage apparatus only when necessary. Accordingly, the power consumption of the overall storage system can be reduced without requiring any complicated settings.

BRIEF DESCRIPTION OF DRAWINGS

FIG. 3 is a conceptual diagram explaining the journal volume management table.

DETAILED DESCRIPTION

An embodiment of the present invention is now explained in detail with reference to the attached drawings.

Figure 1:
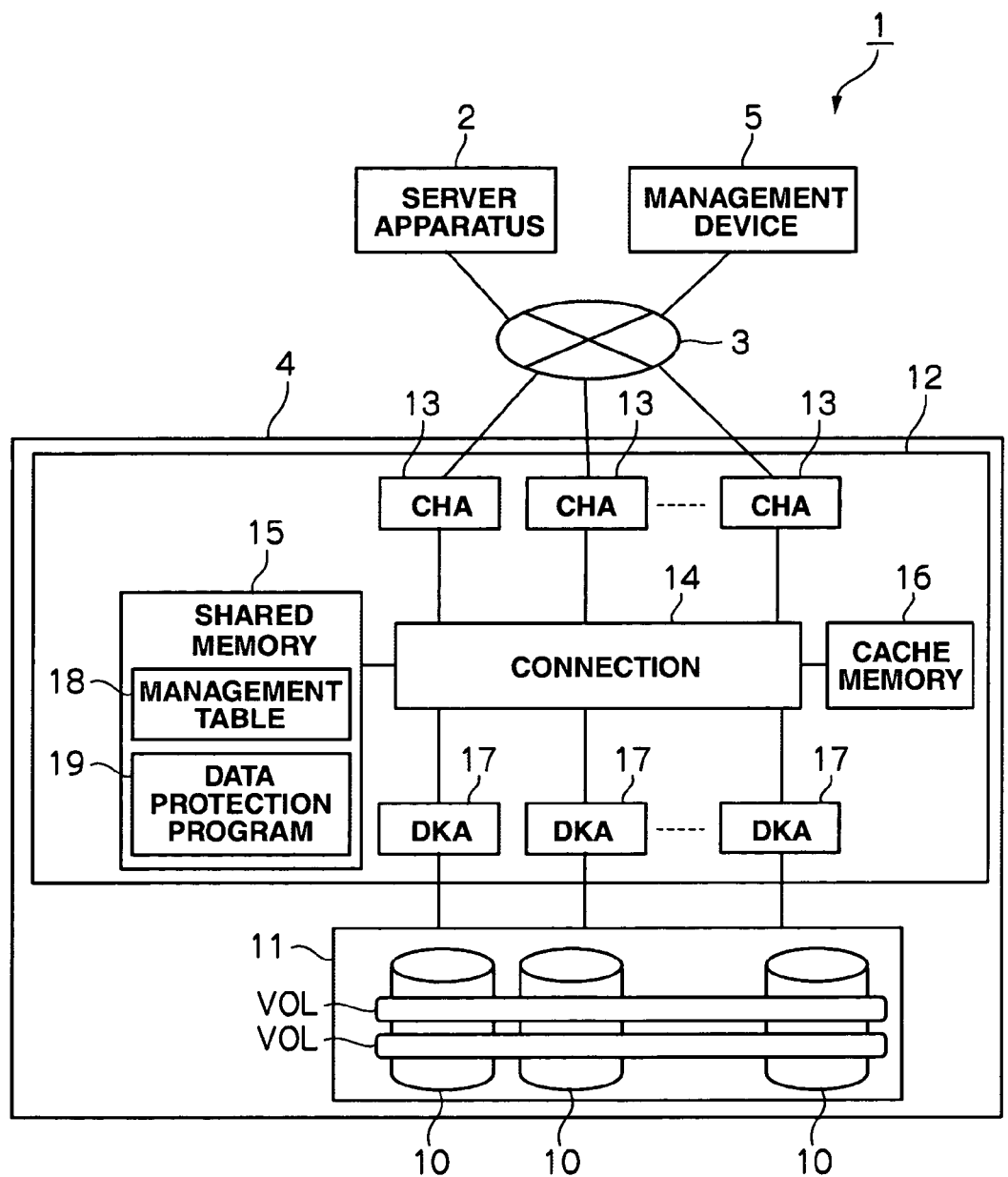
FIG. 1 is a block diagram showing an overall configuration of the storage according to an embodiment of the present invention.

(1) First Embodiment (1-1) Configuration of Storage System in Present Embodiment FIG. 1 shows the overall storage system 1 according to the present embodiment. Referring to FIG. 1, the storage system comprises a server device 2 connected to a storage apparatus 4 via a network 3, and a management terminal 5 connected to the network 3.

The server device 2 is a computer device including information processing resources such as a CPU (Central Processing Unit) and memory, and, for instance, is configured from a personal computer, workstation, mainframe or the like. Further, the server device 2 has an information input device (not shown) such as a keyboard, switch, pointing device or microphone, and an information output device such as a monitor display or speaker.

The network 3, for example, is configured from a SAN (Storage Area Network), LAN (Local Area Network), the Internet, a public line, or a dedicated line. Communication between the server device 2 and storage apparatus 4 via the network 3 is conducted according to a fibre channel protocol when the network 3 is a SAN, and conducted according to a TCP/IP (Transmission Control Protocol/Internet Protocol) protocol when the network 3 is a LAN.

The storage apparatus 4 is configured by including a disk device unit 11 formed from a plurality of disk devices 10, and a controller 12 for controlling the respective disk devices 10.

The disk device 10, for instance, is configured from an expensive disk drive such as an FC (Fibre Channel) disk, or an inexpensive disk drive such as a FATA (Fibre Attached Technology Adapted) disk, SATA (Serial AT Attachment) disk or optical disk drive. One or more logical volumes (hereinafter referred to as "logical volumes") VOL are defined in a storage extent provided by one or more disk devices 10. Data from the server device 2 is read from and written into these logical volumes VOL in block units of a prescribed size.

Each logical volume VOL is assigned a unique identifier (LUN: Logical Unit Number). In the present embodiment, an identifier and a unique number (LBA: Logical Block Address) allocated to each block are set as the address, and the input and output of user data is conducted by designating such address.

As the attributes of the logical volume VOL created in the storage apparatus 4, there are a system volume, business volume, backup volume and journal volume.

Among the above, a system volume is primarily used for retaining control information such as the system configuration information and various control programs relating to the configuration of the overall storage apparatus 4. Further, a business volume is used by the server device 2 to read and write user data. Moreover, a backup volume is used to copy all data of the business volume at a certain point in time for data protection as described later. Lastly, a journal volume is used for storing journals as described later.

A controller 12 comprises a plurality of channel adapters 13, a connection 14, a shared memory 15, a cache memory 16, and a plurality of disk adapters 17.

Each channel adapter 13 is configured as a microcomputer system including a microprocessor, memory, communication interface and so on, and has a port for connection to the network 3. The channel adapter 13 interprets the various commands sent from the server device 2 and performs necessary processing to execute such commands. A network address (for example, IP address or WWN) is allocated to the port of each channel adapter 13 for identifying the respective channel adapters 13, and, as a result, each channel adapter 13 is able to individually function as a storage apparatus.

The connection 14 is connected to the channel adapter 13, the shared memory 15, the cache memory 16, and the disk adapter 17. The sending and receiving of data and commands among the channel adapter 13, the shared memory 15, the cache memory 16, and the disk adapter 17 are conducted via the connection 14. The connection 14, for example, is configured from a switch such as an ultra fast crossbar switch or a bus that transfers data by high-speed switching.

The shared memory 15 is a storage memory to be shared by the channel adapters 13 and the disk adapters 17. The shared memory 15 is primarily used for storing system configuration information and various control programs read from the system volume when the storage apparatus 4 is turned on, or commands from the server device 2. The journal volume management table 18 and the data protection program 19 as described later are also stored in the shared memory 15.

The cache memory 16 is also a storage memory to be shared by the channel adapters 13 and the disk adapters 17. This cache memory 16 is primarily used for temporarily storing user data to be input to and output from the storage apparatus 4.

Each disk adapter 17 is configured as a microcomputer system having a microprocessor, memory and the like, and functions as an interface for controlling the protocol during communication with each disk device 10. These disk adapters 17, for instance, are connected to the corresponding disk devices 10 via a fibre channel cable, and send and receive data to and from the disk devices 10 according to such fibre channel protocol.

The management device 5, as with the server device 2, is a computer device including information processing resources such as a CPU and memory. The management device 5, for instance, is configured from a personal computer, workstation, or portable information terminal. The management device 5 has a display device for displaying GUI (Graphical User Interface) used to perform various settings in the storage apparatus 4 as well as various types of information, and an input device such as a keyboard or mouse for the system administrator to perform various operations or input various settings. The management device 5 performs various processing based on various commands input via the input device.

(1-2) Power Supply Control Function in Storage System of Present Embodiment (1-2-1) Data Protection System Employed in Storage System The data protection system referred to as CDP (Continuous Date Protection) employed in the storage system 1 according to the present embodiment will be explained below.

Figure 2A:
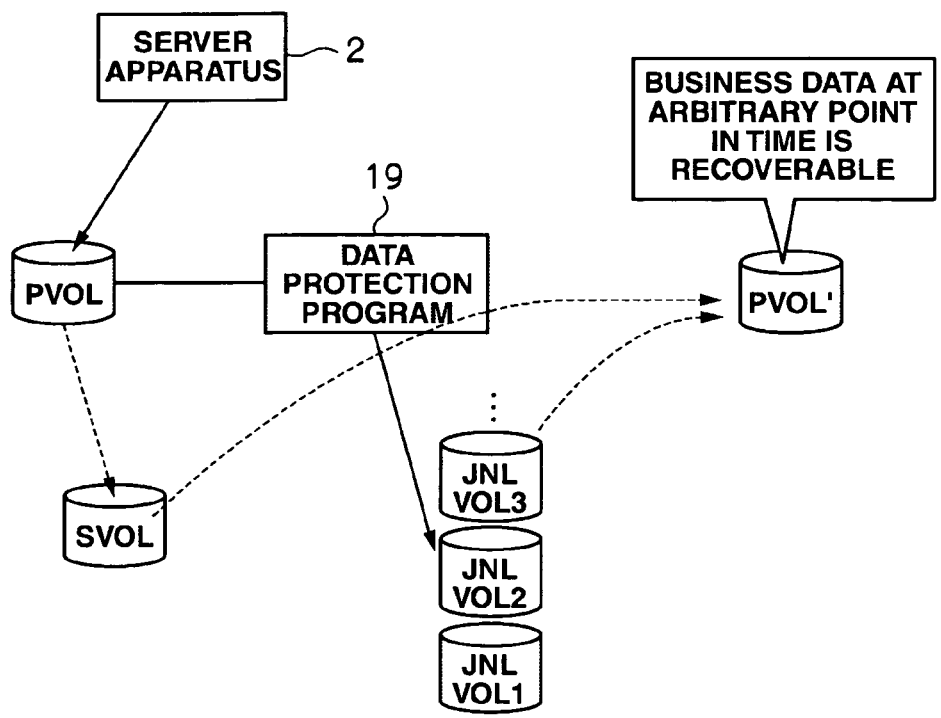
FIGS. 2A and 2B are conceptual diagrams explaining the data protection system.
Figure 2B:
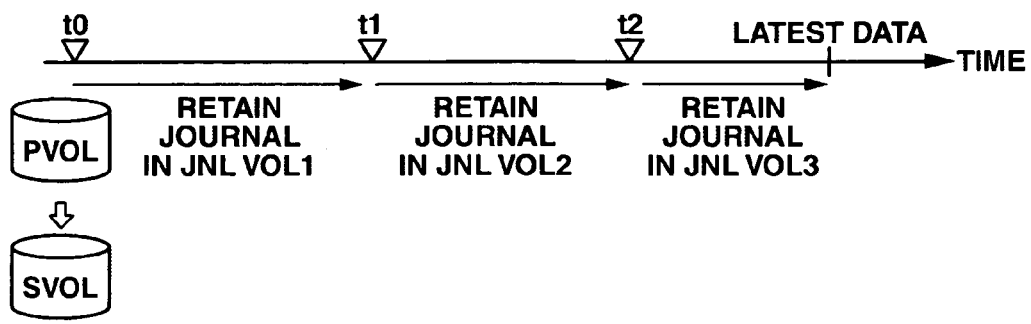

With the storage system 1, as shown in FIG. 2A and FIG. 2B, at the outset, full volume copy of copying all data of a business volume PVOL in the storage apparatus 4 to a backup volume SVOL is performed at a certain timing. Subsequently, once the server device 2 writes user data in the business volume PVOL thereafter, such user data and a journal containing management information such as the address and time of the business volume PVOL in which the user data was written are stored in journal volumes JNLVOL (JNLVOL1, JNLVOL2, JNLVOL3, . . . ) configured in an upper-level storage apparatus or a lower-level storage apparatus.

Thus, by using the full volume copy of the business volume PVOL stored at a certain point in time in the backup volume SVOL, the storage system 1 allows the business volume PVOL at such point in time to be recovered in a manner of, for instance, sequentially overwriting user data of a desired point in time into the full volume copy of the business volume in order from the oldest user data contained in the journal stored in the journal volume.

(1-2-2) Volume Management Table and Data Protection Program

The power supply control function employed in the storage system 1 according to the present embodiment will be explained below.

This storage system 1 is equipped with a power supply control function for performing necessary power supply control of the disk device 10 according to the storage quantity of the journals stored in the journal volume.

Figure 5A:
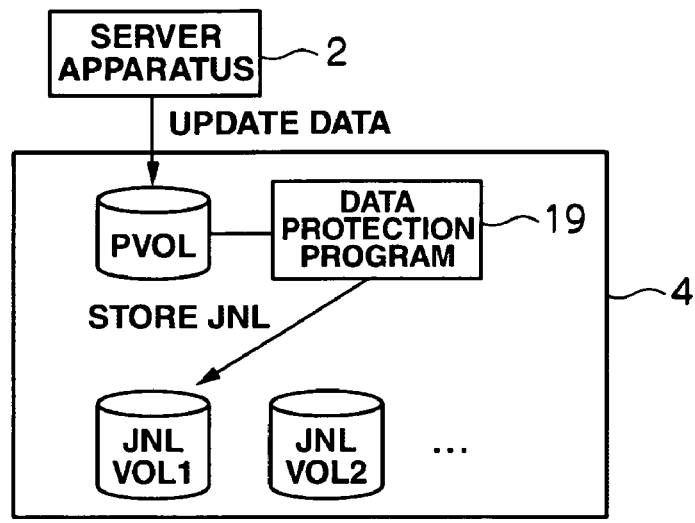
FIGS. 5A-5C are conceptual diagrams explaining the data creation and storage processing according to an embodiment of the present invention.
Figure 5B:
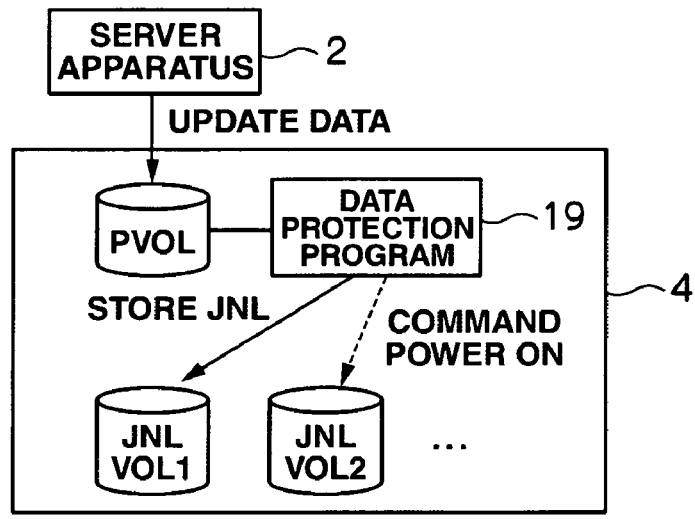

In this storage system 1, as shown in FIG. 5A, while sequentially storing journals representing the update history of the business volume of the storage apparatus 4 in a single journal volume (hereinafter referred to as a "journal storage destination volume") configured in the storage apparatus 4, as shown in FIG. 5B, power of the disk device 10 to provide the journal volume set forth in a subsequent journal storage destination volume is turned on at the stage when the storage quantity of journals in the journal storage destination volume reaches a predetermined threshold value set to the journal volume.

Figure 5C:
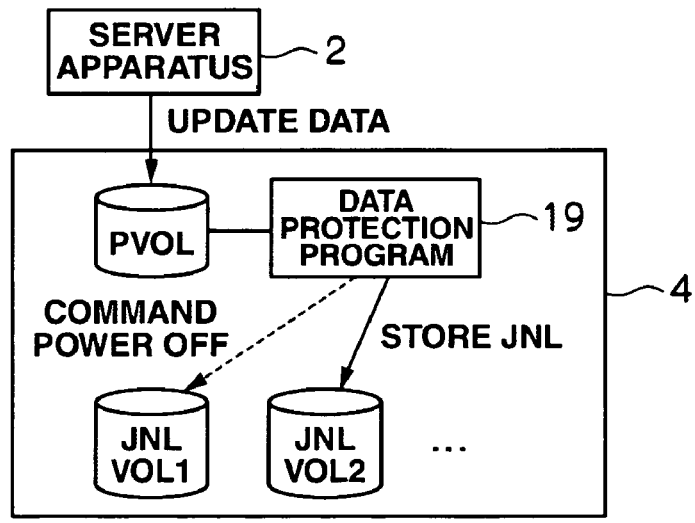

Further, as shown in FIG. 5C, the storage system 1 thereafter switches the journal storage destination to the subsequent journal destination volume at the stage when it is no longer possible to store journals in the current journal storage destination volume on the one hand, and, simultaneously with this, turns off the power of the disk device 10 that provided the previous journal storage destination volume.

Thus, the storage system 1 allows the power consumption of the overall system to be reduced by way of performing such power supply control of the disk devices 10.

As a means for performing this kind of power supply control, a journal volume management table 18 and a data protection program 19 may be stored in the shared memory 15 (FIG. 1) of the storage apparatus 4.

The journal volume management table 18 is a table for managing the journal volume configured in the storage apparatus 4. This volume management table 18, as shown in FIG. 3, includes an entry number field ("#") 18A, a storage identifying information field ("storage apparatus") 18B, a volume identifying information field ("LU#") 18C, a volume capacity field ("LU capacity") 18D, a journal storage quantity field ("JNL storage quantity") 18E, a threshold value field ("threshold value") 18F, a first journal identifying information field ("JNL identifying information (first)") 18G, a last journal identifying information field ("JNL identifying information (last)") 18H, a status information field ("status information") 18I, and a snapshot information field ("snapshot acquisition information") 18J.

Among the above, an entry number to the journal volume management table 18 of the corresponding journal volume is stored in the entry number field 18A. Further, an identifying number (LUN for example) of such journal volume is stored in the storage identifying information field 18C, and the capacity of such journal volume is stored in the volume capacity field 18D.

Moreover, the storage quantity of the current journal in such journal volume is stored in the journal storage quantity field 18E, and the threshold value set in advance by the system administrator regarding such journal volume as described later is stored in the threshold value field 18F. In addition, the creation time and identifying information of the journal stored first in such journal volume are stored in the first journal identifying information field 18G, and the creation time and identifying information of the journal stored last in such journal volume are stored in the last journal identifying information field 18H.

Status information representing the power supply status (on or off) of the disk device 10 to provide such journal volume is stored in the status information field 18I. Further, information regarding whether a snapshot of such journal volume has already been acquired is stored in the snapshot information field 18J.

Figure 4:
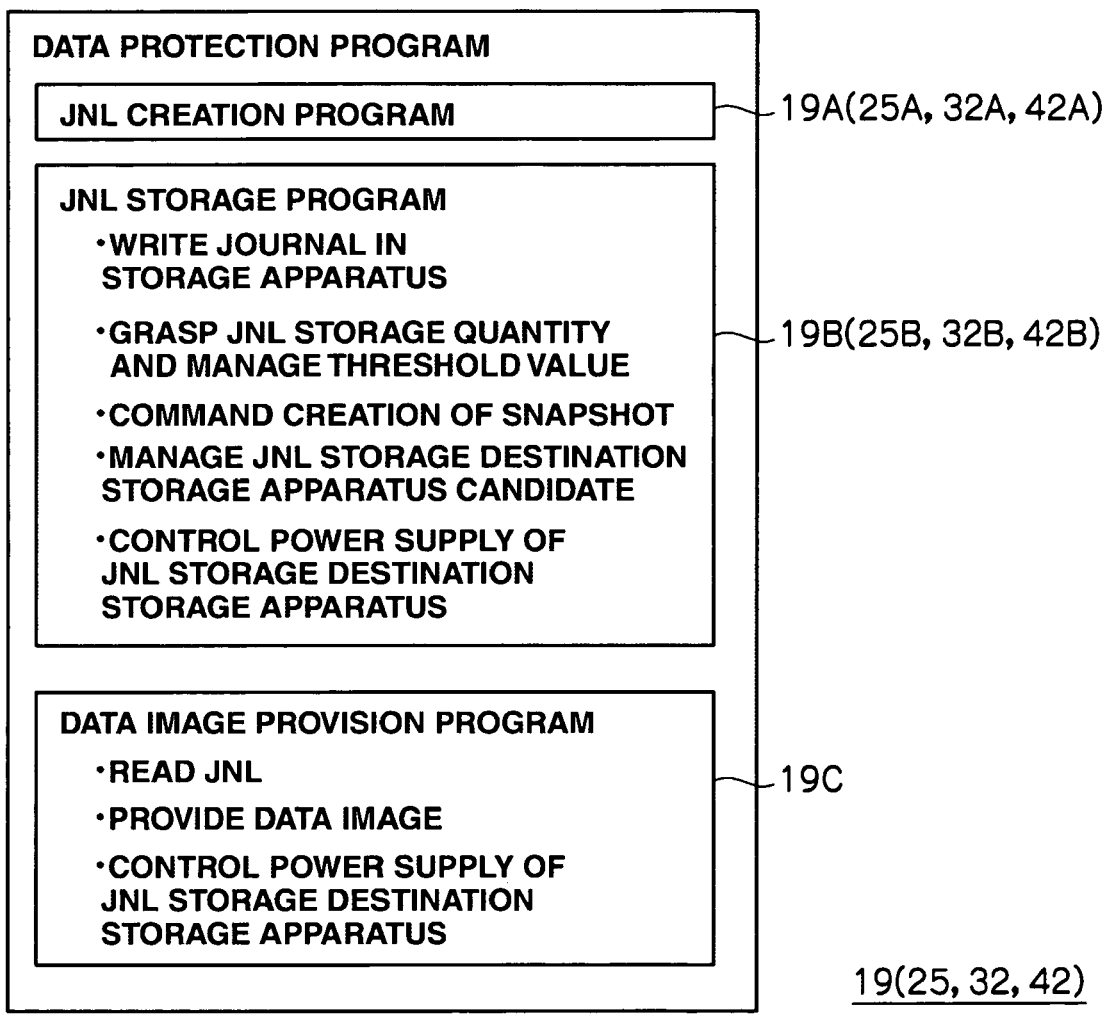
FIG. 4 is a conceptual diagram explaining the data protection program.

Referring to FIG. 4, the data protection program 19 includes a journal creation program 19A, a journal storage program 19B, and a data image provision program 19C.

Among the above, the journal creation program 19A is a program for creating journals. When user data to be written and its data write request are sent from the server device 2, the channel adapter 13 of the storage apparatus 4 writes such user data into the business volume, and creates a journal containing the user data and management information of such user data according to the journal creation program 19A.

Further, the journal storage program 19B is a program for performing: (1) storage control processing of journals, such as the writing of the created journal in the journal volume, management of the storage quantity and threshold value of journals in the respective journal volumes, and management of creation commands of snapshots to the journal creation program, and journal volumes to be the storage destination candidates of journals as described later; and (2) power supply control processing of the disk device 10 to provide the journal volume to become the storage destination of journal data. The channel adapter 13 of the storage apparatus 4, as required, performs the storage control processing of journals and the necessary power supply control processing of the disk device 10 according to this journal storage program 19B.

Further, the journal image provision program 19C is a program for creating a data image of the business volume at a designated point in time and providing such data image to the user. The channel adapter 13 of the storage apparatus 4 creates a data image of the business volume at a time designated by the system administrator based on this journal image provision program 19C by way of using the journal stored in the journal volume and provides such data image to the user. In addition, the channel adapter 13 performs the necessary power supply control processing of the disk device 10.

(1-2-3) Journal Creation and Storage Processing

Figure 6:
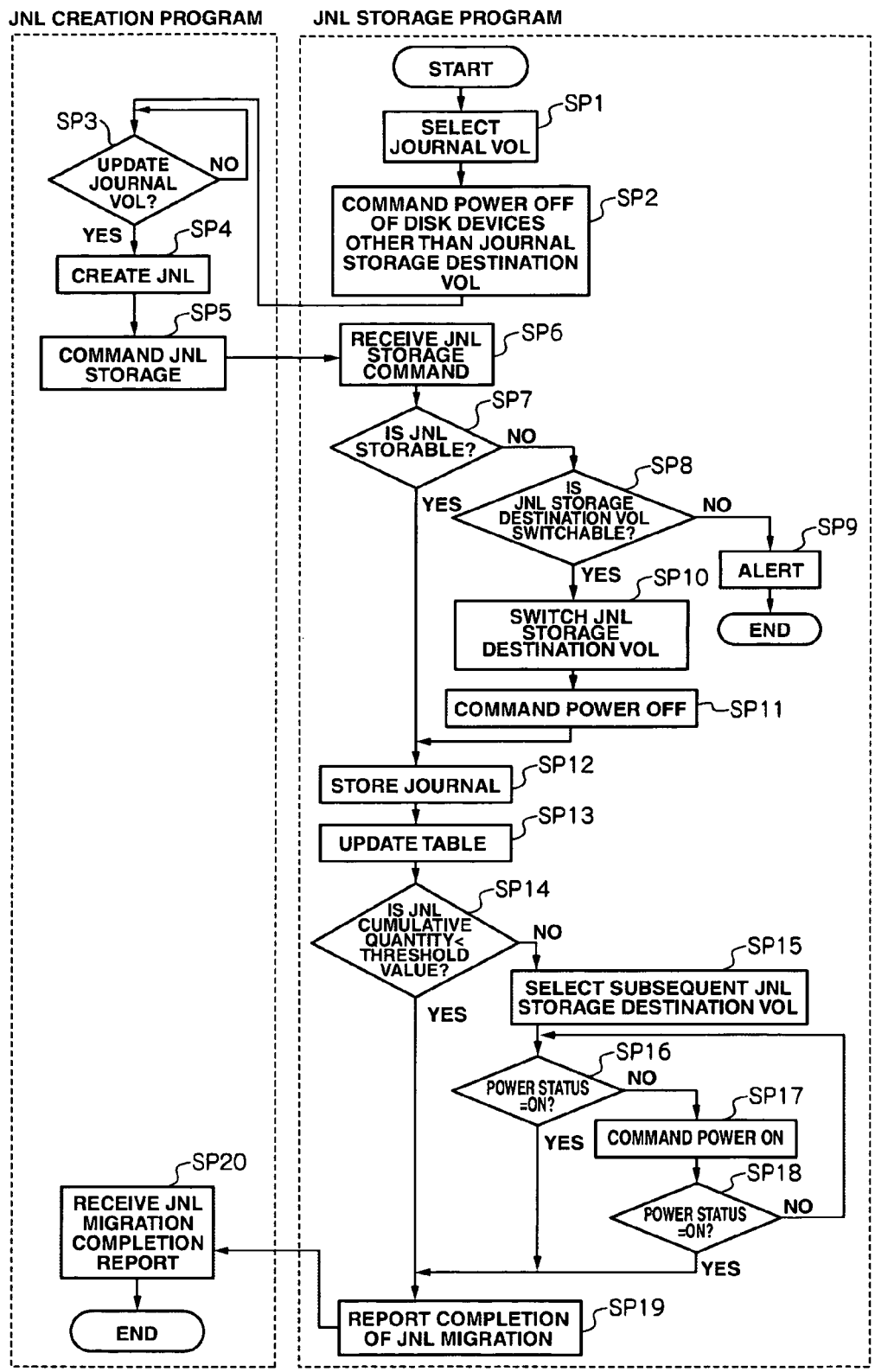
FIG. 6 is a flowchart explaining the data creation and storage processing according to the first embodiment.

FIG. 6 is a flowchart showing the processing contents of the channel adapters 13 in the storage apparatus 4 concerning the journal creation and storage processing in the storage system 1. In FIG. 6, processing in the section on the left side enclosed with broken lines is performed based on the journal creation program 19A, whereas processing in the section on the right side enclosed with broken lines is performed based on the journal storage program 19B.

The channel adapter 13 initially selects one journal volume to become the journal storage destination volume (SP1). The selection method of such journal storage destination volume may be conducted, for instance, by applying a method of selecting the journal volume with the smallest entry number among the journal volumes registered in the journal volume management table 18.

By way of controlling the necessary disk device 10 via the disk adapter 17, the channel adapter 13 turns off the power of the respective disk devices 10 to provide journal volumes other than the journal volume selected as the journal storage destination volume (SP2).

Subsequently, the channel adapter 13 awaits the business volume to be updated (SP3). When user data from the server device 2 is eventually written into the business volume, the channel adapter 13 creates a corresponding journal (SP4). The channel adapter 13 thereafter commands the journal storage program 5 to store the created journal in the journal storage destination volume (hereinafter referred to as a "journal storage command") (SP5).

When the channel adapter 13 receives such journal storage command from the journal creation program 19A (SP6), it refers to the journal volume management table 18 and determines whether the current journal storage destination volume has sufficient capacity for storing the data of such journal (SP7).

When the channel adapter 13 obtains a positive result in this determination, it stores such journal in the journal storage destination volume by controlling the corresponding disk device 10 via the disk adapter 17 (SP12).

Then, the channel adapter 13 updates the "journal storage quantity" field 18E (FIG. 3) in the journal volume management table 18 according to the processing at step SP13 (SP13), and thereafter refers to this journal volume management table 18 and determines whether the journal quantity stored in the journal storage destination volume is smaller than the predetermined threshold value set to the journal storage destination volume (SP14).

When the channel adapter 13 obtains a positive result in this determination, it issues to the journal creation program 19A a journal storage completion report for reporting that the storage of the journal is complete (SP19). When the channel adapter 13 receives the journal storage completion report from the journal storage program 19B (SP20), it ends this journal creation and storage processing.

In contrast to this, when the channel adapter 13 obtains a negative result in the determination at step SP14, it selects a journal volume to become the subsequent journal storage destination volume (SP15). The selection method of such journal storage destination volume in this case may also apply the method of selecting a journal volume in the order from the smallest entry number among the journal volumes registered in the journal volume management table 18.

Then, the channel adapter 13 refers to the corresponding "status information" field 181 of the journal volume management table 18, and determines whether the disk device 10 to provide the journal volume selected at step SP15 is turned on (SP16). When the channel adapter 13 obtains a positive result in this determination, it issues a journal completion report to the journal creation program 19A (SP19).

When the channel adapter 13 obtains a negative result in the determination at step SP16, it commands the disk adapter 17 to turn on the power of such disk device 10 (hereinafter referred to as the "power-on command") (SP17).

Thereafter, the channel adapter 13 determines whether the disk device 10 has been turned on based on the response from the disk adapter 17 to the power-on command (SP18).

When the channel adapter 13 obtains a positive result in this determination, it updates the status information stored in the corresponding "status information" field 181 of the journal volume management table 18 to "Ready" representing that the power of the corresponding disk device 10 has been turned on, and thereafter issues a journal storage completion report to the journal creation program (SP19).

When the channel adapter 13 obtains a negative result at step SP18, it returns to step SP15 and, while sequentially switching the target journal volumes, repeats the same processing steps until the power of the disk device 10 to provide any journal volume to become the subsequent journal storage destination volume is turned on (SP16 to SP18-SP16).

In the meanwhile, when the channel adapter 13 obtains a negative result in the determination at step SP7, it determines whether the journal storage destination can be switched to the subsequent journal storage destination volume in which the power of the corresponding disk device 10 was been turned on in the processing at step SP14 to step SP19 performed in advance, for instance, based on the failure information and journal volume management table 18 stored in the shared memory 15 (SP8).

It is noted that to obtain a negative result in this determination implies that a journal cannot be stored since a failure occurred in the journal volume selected as the subsequent journal storage destination volume, otherwise that a journal volume capable of becoming the subsequent journal storage destination volume does not exist. As a result, in this case, the channel adapter 13 notifies warning information to such effect to the management device 5 (SP9), and thereafter ends this journal creation and storage processing.

It is also noted that to obtain a positive result in the determination at step SP8 implies that a journal volume capable of becoming the subsequent journal storage destination volume is in a state of being able to store journals. As a result, the channel adapter 13 switches the journal storage destination to the journal volume selected as the subsequent journal storage destination volume (SP10).

Further, the channel adapter 13 issues a power-off command to the disk adapter 17 for turning off the power of the disk device 10 to provide the journal volume used as the journal storage destination volume up to that time (SP11). Furthermore, the channel adapter 13 thereafter updates the status information stored in the corresponding "status information" field 181 of the journal volume management table 18 to "Not Ready" representing that the power of the corresponding disk device 10 has been turned off (SP11).

By thereafter controlling the corresponding disk device 10 via the disk adapter 17, the channel adapter 13 stores the journal created at step SP4 into the new journal storage destination volume (SP12). Further, the channel adapter 13 thereafter performs step SP14 to step SP20 as with the processing described above and thus ends this journal creation and storage processing.

(1-2-4) Data Recovery Processing

Figure 7:
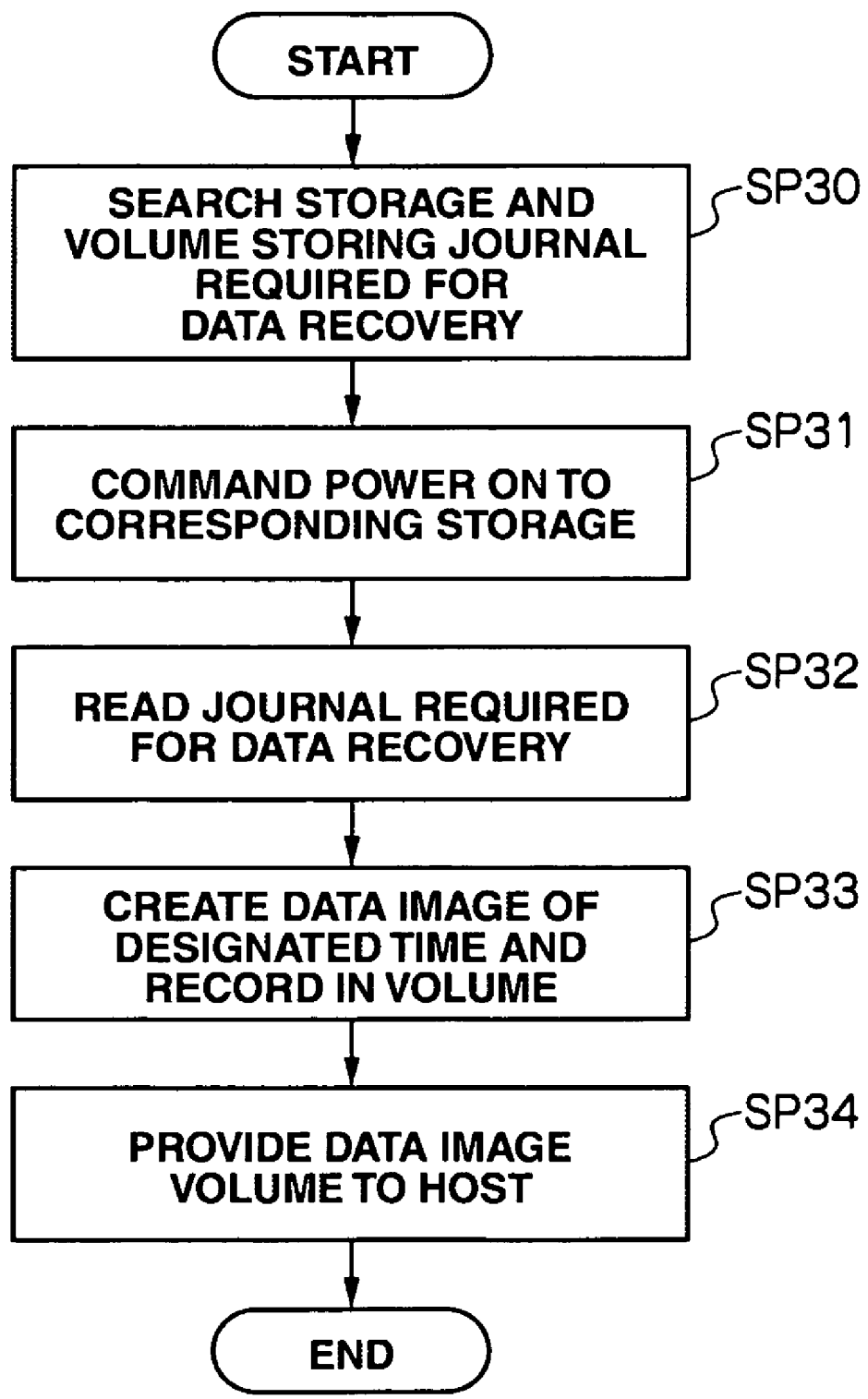
FIG. 7 is a flowchart explaining the data recovery processing.

FIG. 7 is a flowchart showing the processing contents of the channel adapter 13 of the storage apparatus 4 concerning the data recovery processing. When a volume recovery request designating the time of recovery is given from the management device 5 according to operations of the system administrator, the channel adapter 13 performs this data recovery processing according to the data image provision program 19C configuring the data protection program 19 stored in the shared memory 15.

Specifically, the channel adapter 13 foremost searches for the journal volume storing the journal required for recovering the business volume up to the designated time and the storage apparatus including such journal volume based on the information stored respectively in the "first journal identifying information" field 18G and "last journal identifying information" field 18H of the journal volume management table 18 (SP30).

Then, the channel adapter 13 turns on the respective disk devices 10 to provide the journal volume detected at step SP 30 via the disk adapter 17 (SP31). Further, the channel adapter 13 thereafter changes the status information stored in the "status information" field 181 of the respective corresponding entries in the journal volume management table 18 to "Ready."

Subsequently, the channel adapter 13 reads the journal data required for recovering the business volume at the time designated by the system administrator from the journal volume detected at step SP30 (SP32).

Then, the channel adapter 13 creates a data image of the business volume of the designated time based on this read journal data and the data image at a certain time of the business volume stored in the backup volume in advance, and stores this created data image in any logical volume VOL of the storage apparatus 4 (SP33).

The channel adapter 13 presents to the server device 2 a logical volume VOL storing the data image of the business volume at the time designated by the system administrator in substitute for the business volume that was being provided up to that time (SP34). As a result, the user can use the business volume recovered up to the time designated by the system administrator in the business volume. The channel adapter 13 thereafter ends this data recovery processing.

(1-3) Effect of Present Embodiment

As a result of the configuration described in detail above, the present embodiment of the invention may include one or more following advantages, some of which have been discussed above. According to the present embodiment, among other things, journals are sequentially stored in the journal storage destination volume, power of the disk device 10 to provide the journal volume to become the subsequent journal storage destination volume is turned on at a stage when the journal storage quantity in the journal storage destination volume reaches a threshold value, and power of the disk device 10 that provided the previous journal storage destination volume is turned off at a timing of switching the journal storage destination. Accordingly, the storage system 1 allows the disk device 10 to be driven only when required by merely setting the threshold value to the respective journal volumes. In addition, it is possible to reduce the power consumption without requiring any complicated settings.

Figure 8:
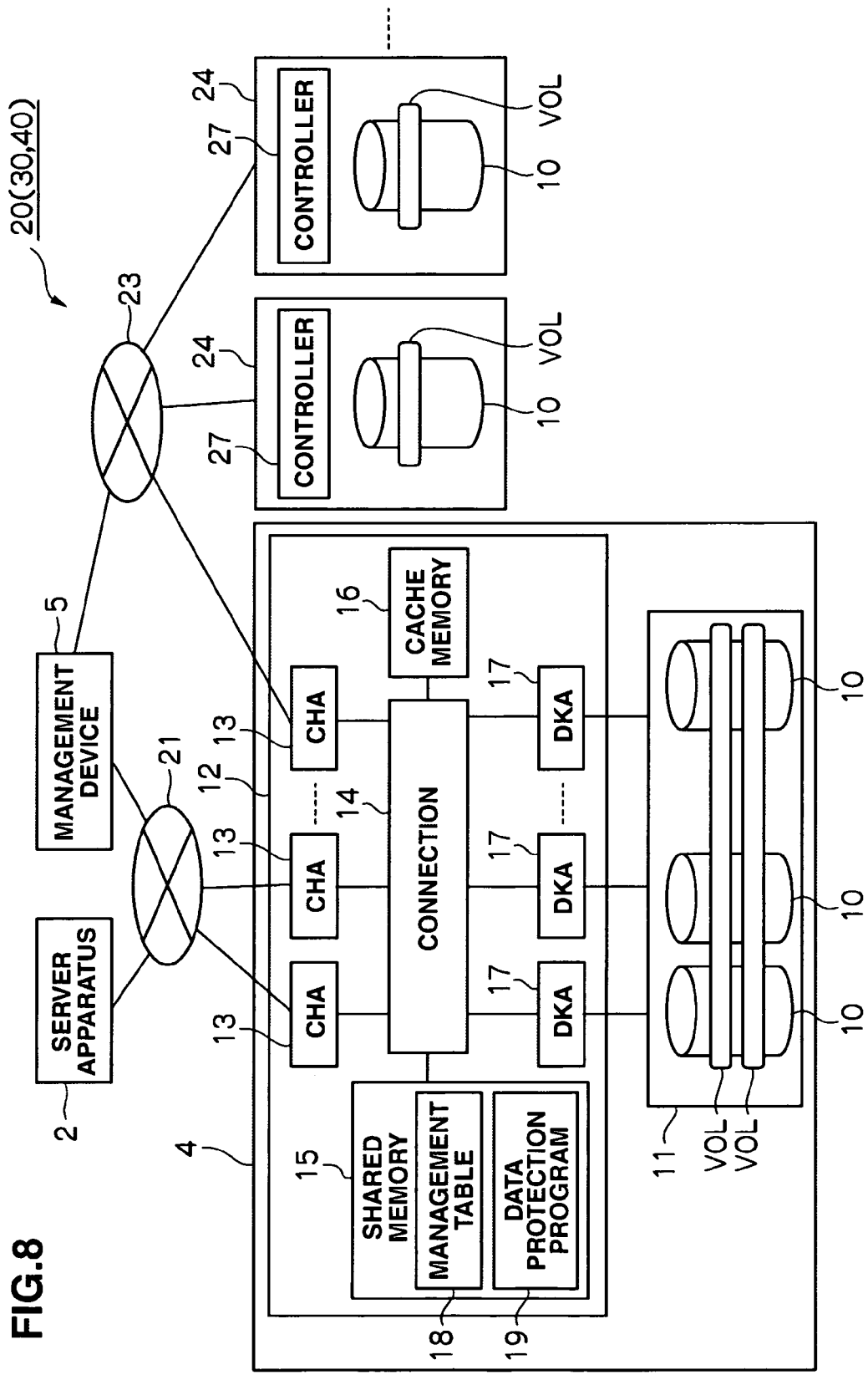
FIG. 8 is a block diagram showing an overall configuration of the storage system according to the second to fourth embodiments.

(2) Second Embodiment (2-1) Configuration of Storage System in Second Embodiment FIG. 8, which shows the same reference numerals for components corresponding to those illustrated in FIG. 1, illustrates a storage system 20 according to a second embodiment of the invention. This storage system 20 comprises the server device 2 connected to a storage apparatus 22 via a first network 21, the storage apparatus 22 connected to a plurality of external storage apparatuses 2 via a second network 23, and the management device 5 connected to the storage apparatus 22 and external storage apparatus 24 via the first and second networks 21 and 23.

The storage apparatus 22 has a virtualization function for virtualizing a storage extent provided by the storage apparatus 24, per se, and the respective external storage apparatuses 24, and a power supply control function for performing power supply control processing to the external storage apparatus 24 as described later. The storage apparatus 22 may have the same configuration as, or equivalent to, the storage apparatus 4 (FIG. 1) of the first embodiment except that the data protection program 25 is stored in the shared memory 15. It would be understood that "virtualization" means a process of presenting to the server device 2 that the storage extent provided by the storage apparatus 24, per se, and the respective external storage apparatuses 24 exists as though a single extent continuing in the own storage apparatus.

In the storage apparatus 22 of this embodiment, for example, an expensive disk drive such as an FC disk may be used as the disk device 10. Further, in this embodiment, registered in the journal volume management table 18 stored in the shared memory 15 of the storage apparatus 22 is a logical volume VOL configured in the journal volume among the logical volumes VOL existing in the virtual space formed by virtualizing the storage extent provided by such storage apparatus 22 and the respective external storage apparatuses 24.

The external storage apparatus 24 may have the configuration same as, or equivalent to, the storage apparatus 22 except that the controller 27 does not have the foregoing virtualization function and power supply control function. In the external storage apparatus 24, in addition to the FC disk as the disk device 10, inexpensive disk drives such as a FATA disk, SATA disk, or optical disk drive may be used. Thus, one or more logical volumes VOL are also created in these external storage apparatuses 24, and a part or the whole thereof is used as the journal volume for storing the journal data described above created in the storage apparatus 22.

Further, as the first and second networks 21, 23, SAN or the like may be used as with the network 3 (FIG. 3) according to the first embodiment.

(2-2) Power Source Control Function in Storage System of Present Embodiment

The power supply control function employed in the storage system 20 according to the present embodiment will be explained below. One feature of this storage system 20 is that it temporarily stores a journal representing update history of the business volume of the storage apparatus 22 in the journal storage destination volume in the storage apparatus 22, and thereafter migrates such journal to a low-cost external storage apparatus, while controlling the power supply of the corresponding disk device 10 in the external storage apparatus 24 pursuant to the migration of the journal on the other hand.

Figure 9A:
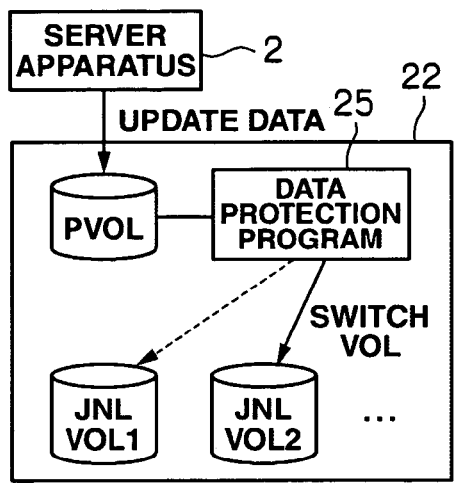
FIGS. 9A-9D are conceptual diagrams explaining the data creation and storage processing.
Figure 9B:
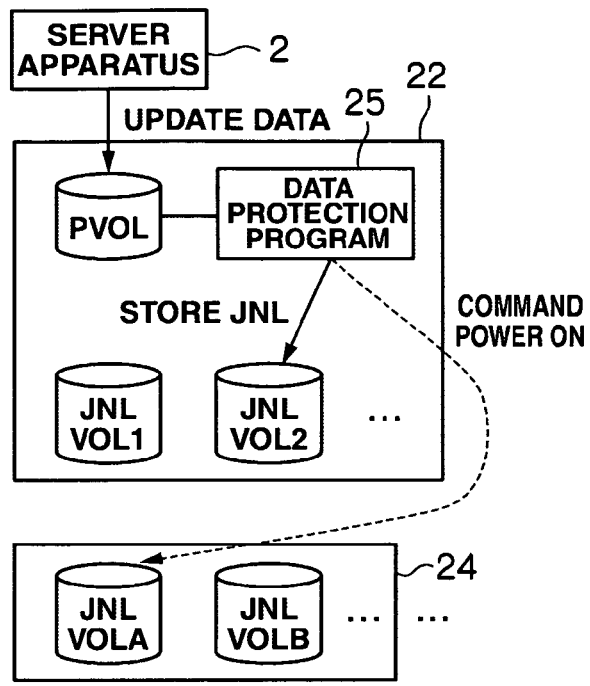

In this storage system 20, the storage apparatus 22, in the timing of switching the journal storage destination to the subsequent journal storage destination volume as shown in FIG. 9A, turns on the power of the disk device 10 to provide the journal volume to become the journal migration destination (hereinafter referred to as the "journal migration destination volume") in the external storage apparatus 24 as shown in FIG. 9B.

Figure 9C:
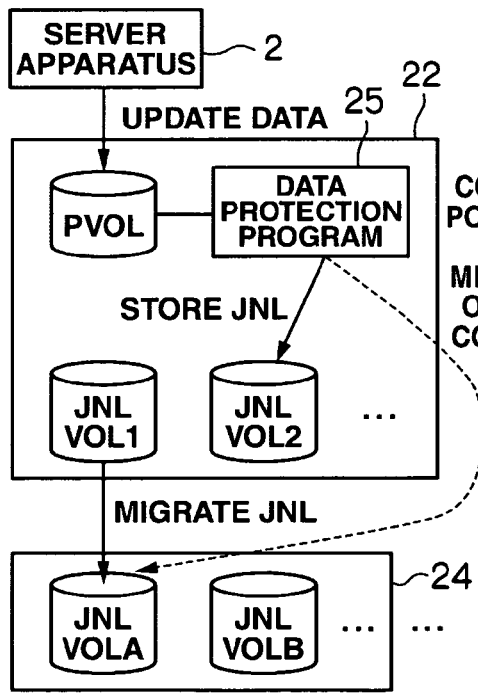

Further, as shown in FIG. 9C, the storage apparatus 22 migrates the journal stored in the original journal storage destination volume to such journal migration destination volume, and then turns off the power of the disk device 10 to provide the journal migration destination volume at the time such migration is complete.

Figure 9D:
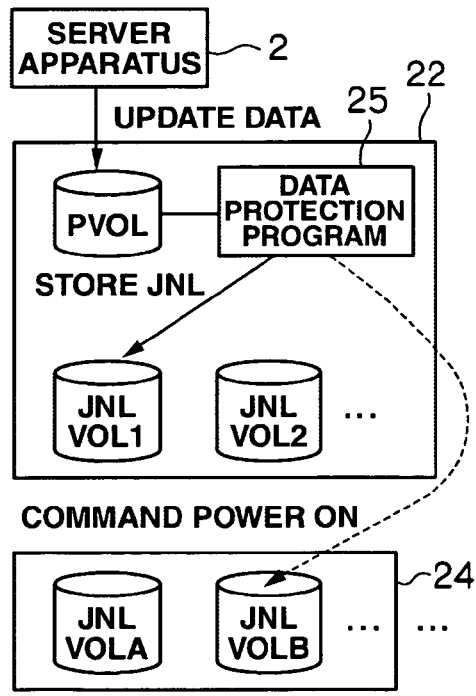

Further, as shown in FIG. 9D, the storage apparatus 22 thereafter turns on the power of the disk device 10 once again at the timing of switching the journal storage destination to the subsequent journal volume, and thus repeats the processing steps explained with reference to FIG. 9C and FIG. 9D.

As a result, this storage system 20 can reduce the power consumption of the overall system while retaining journals inexpensively by performing the power supply control of the disk device 10 of this kind of external storage apparatus 24.

Figure 10:
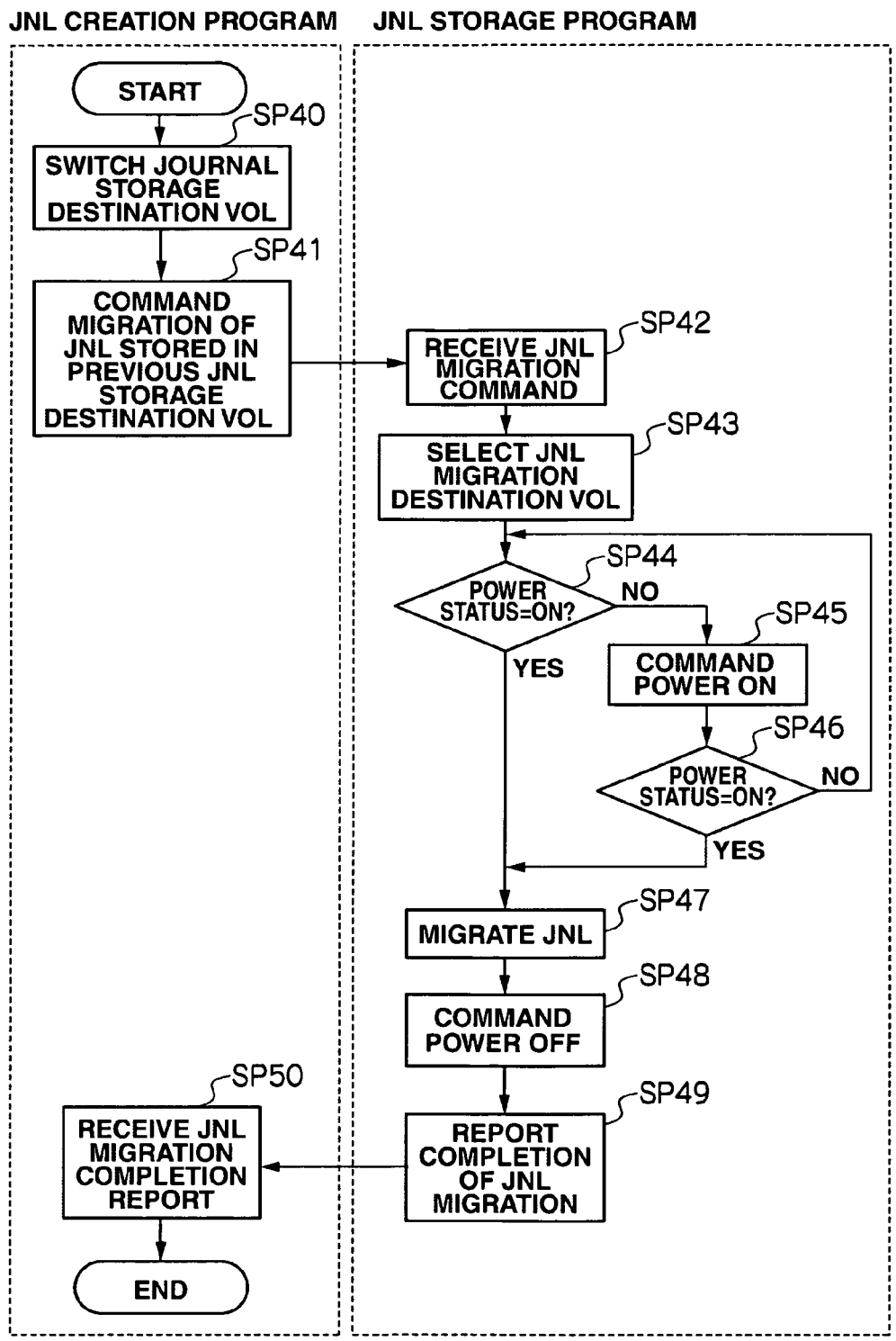
FIG. 10 is a flowchart explaining the external storage power supply control processing according to an embodiment of the present invention.

FIG. 10 is a flowchart showing the processing contents of the channel adapter 13 in the storage apparatus 22 concerning the power supply control processing of this kind of external storage apparatus 24. In FIG. 10, processing in the section on the left side enclosed with broken lines is performed based on the journal creation program 25A (FIG. 4) configuring the data protection program 25, whereas processing in the section on the right side enclosed with broken lines is performed based on the journal storage program 25B (FIG. 4).

When the channel adapter 13 switches the journal storage destination volume to another journal volume in the storage apparatus 22 at step SP10 of the journal creation and storage processing explained with reference to FIG. 6, it commences the external storage power supply control processing in parallel with the journal creation and storage processing, and switches the journal storage destination to the subsequent journal storage destination volume in the storage apparatus 22 (SP40) at the outset.

Subsequently, the channel adapter 13 commands the journal storage program 25B to migrate the journals stored in the journal storage destination volume before switching to the external storage apparatus 24 (hereinafter referred to as the "journal migration command") (SP41).

Then, when the channel adapter 13 receives this journal migration command from the journal creation program 25A (SP42), it selects one journal volume provided in any one of the external storage apparatuses 24 among the journal volumes registered in the journal volume management table 18 (FIG. 3) as the journal migration destination volume (SP43). The selection method of such journal migration destination volume is conducted, for instance, by way of applying a method of selecting the journal volume with the smallest entry number among the journal volumes in the external storage apparatus 24 registered in the journal volume management table 18.

The channel adapter 13 determines whether the power of the disk device 10 to provide the journal migration destination volume selected at step SP43 is turned on based on the status information stored in the corresponding "status information" field 181 of the journal volume management table 18 (SP44).

When the channel adapter 13 obtains a positive result in this determination, it migrates the journals stored in the previous journal storage destination volume to the journal volume selected as the journal migration destination volume at step SP 43 by way of controlling the corresponding external storage apparatus 24 (SP47).

In contrast, when the channel adapter 13 obtains a negative result in this determination, it issues a power-on command for turning on the power of the disk device 10 to provide the journal migration destination volume to the external storage apparatus 24 retaining this journal migration destination volume (SP45).

The channel adapter 13 thereafter determines whether the power of the disk device to provide the journal migration destination volume has been turned on based on the response from the external storage apparatus 24 to such power-on command (SP46).

When the channel adapter 13 obtains a negative result in this determination, it returns to step SP44. Thus, while sequentially switching the journal volume candidates to become the journal migration destination volume to another journal in the external storage apparatus 24, the channel adapter 13 repeats the same processing steps until the power of the disk device 10 to provide any journal volume to become the subsequent journal migration destination volume is turned on (SP44 to SP46-SP44).

When the channel adapter 13 obtains a positive result in this determination at step SP46, it updates the status information stored in the corresponding "status information" field 181 of the journal volume management table 18 to "Ready." Thereafter, the channel adapter 13 migrates the journal stored in the previous journal storage destination volume to the journal migration destination volume by way of controlling the corresponding external storage apparatus 24 (SP47).

When the migration of such journal is complete, the channel adapter 13 issues a power-off command to the external storage apparatus 24 retaining the journal migration destination volume for turning off the power of the disk device 10 to provide the journal migration destination volume (SP48). Further, the channel adapter 13 also updates the status information stored in the corresponding "status information" field 181 of the journal volume management table 18 to "Not Ready" in parallel.

Thereafter, the channel adapter 13 sends the journal creation program 25A a journal migration completion report which shows completion of the migration of the journal (SP49). When the channel adapter 13 receives a journal migration completion report from the journal storage program 25B, it ends this power supply control processing.

(2-3) Effect of Present Embodiment

As a result of the configuration described in detail above, the present embodiment of the invention may include one or more following advantages, some of which have been discussed above. According to the present embodiment, among other things, a journal stored in a high-cost journal storage destination volume of the storage apparatus 22 is migrated to a low-cost journal migration destination volume in the external storage apparatus 24, and the power supply of the disk device 10 to provide the journal migration destination volume is controlled according to the accumulation of journals in the journal storage destination volume on the other hand. Accordingly, it is possible to suppress the power consumption required in retaining the journals while suppressing the costs for retaining such journals.

(3) Third Embodiment

When a positive result could not be obtained in the determination at step SP8 of the data creation and storage processing explained with reference to FIG. 6, since this data creation and storage processing is ended, the journals created thereafter are not stored. As a reason why the journal storage destination volume cannot be switched, for instance, it may be that the power of the disk device 10 to provide the journal volume candidate of the subsequent journal storage destination volume in the storage apparatus 4 cannot be turned on due to a malfunction or the like. Otherwise, it may be that all journal volumes in the storage apparatus 4 (FIG. 1) are exhausted.

In order to continue the journal creation and storage processing, a method may be considered of reusing the previous journal storage destination volume in which the power of the corresponding disk device 10 is turned on without change, and sequentially overwriting and storing a newly created journal in such previous journal storage destination volume.

However, according to this method, the temporal continuity of the stored journals would be lost since the old journals are deleted due to the overwriting of the new journals. Thus, there is a problem that the business volume at a point in time after such overwriting is commenced cannot be accurately reproduced.

Figure 11A:
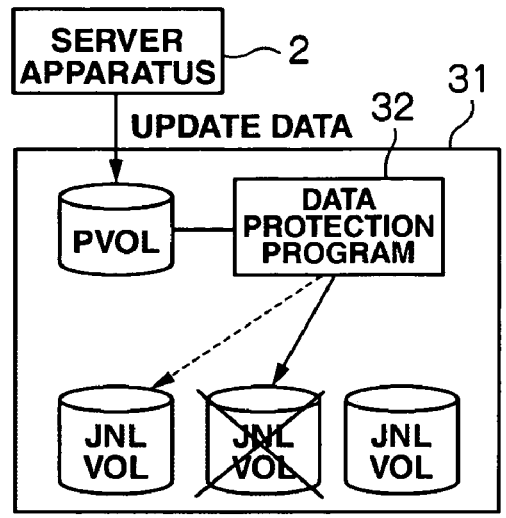
FIGS. 11A and 11B are conceptual diagrams explaining the data creation and storage processing according to an embodiment of the present invention.
Figure 11B:
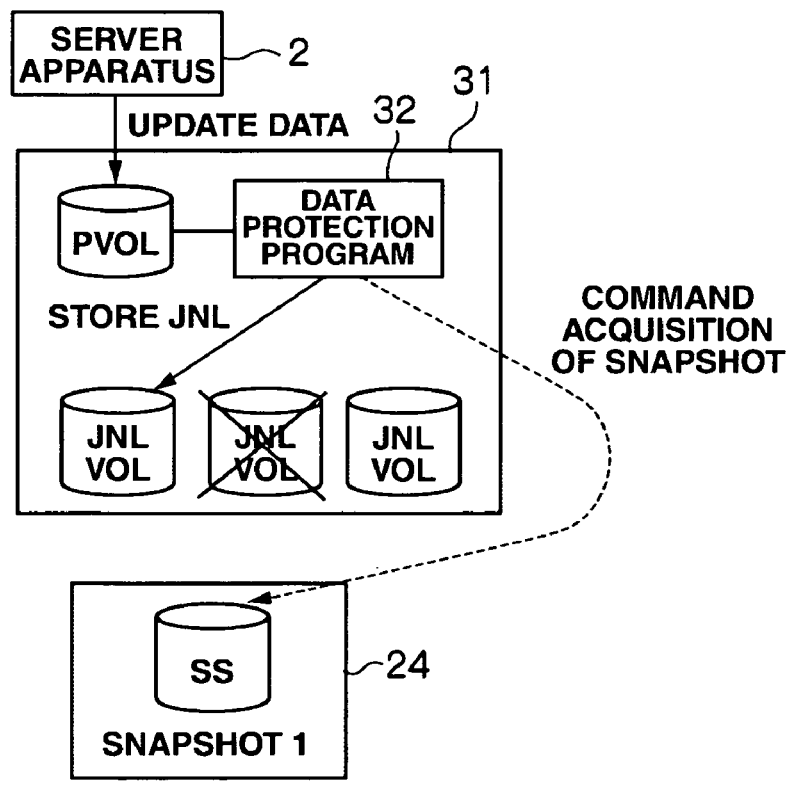

Thus, in the third embodiment, in the storage system 30 of the system configuration depicted in FIG. 8, for instance, as shown in FIG. 11A, when the journal storage destination could not be switched to the subsequent journal storage destination volume in the storage apparatus 31 (refer to step SP8 of FIG. 6), as shown in FIG. 11B, a snapshot (SS) of the business volume (PVOL) at such point in time is created, the created snapshot is stored in the external storage apparatus 24, and the new journal is overwritten in the current journal storage destination volume.

Figure 12A:
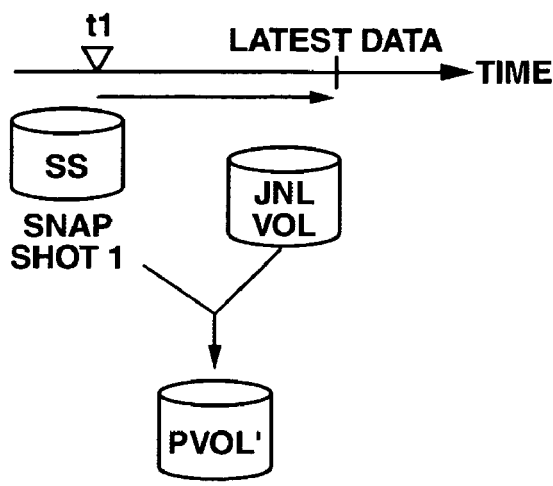
FIGS. 12A and 12B are conceptual diagrams explaining the data creation and storage processing according to an embodiment of the present invention.
Figure 12B:
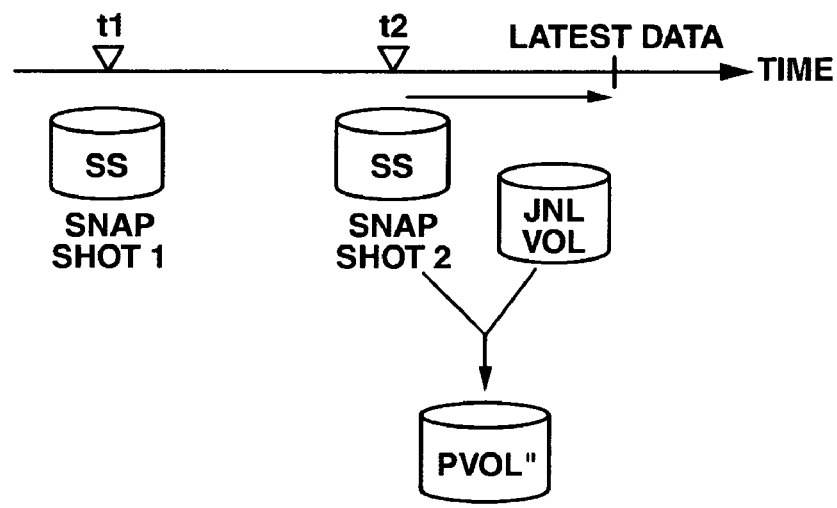

According to this method, as shown in FIG. 12A, by using data of the snapshot (SS) acquired at a certain time t1 and a journal thereafter stored in the journal storage destination volume (JNLVOL), it is possible to create a data image (PVOL') of the business volume at an arbitrary time from time t1 up to the present date. Even if the old journal is lost due to the overwriting of new journals, as shown in FIG. 12B, it is possible to provide a data image of the business volume at time t1 when the snapshot was created by continuously retaining the snapshot.

Figure 13:
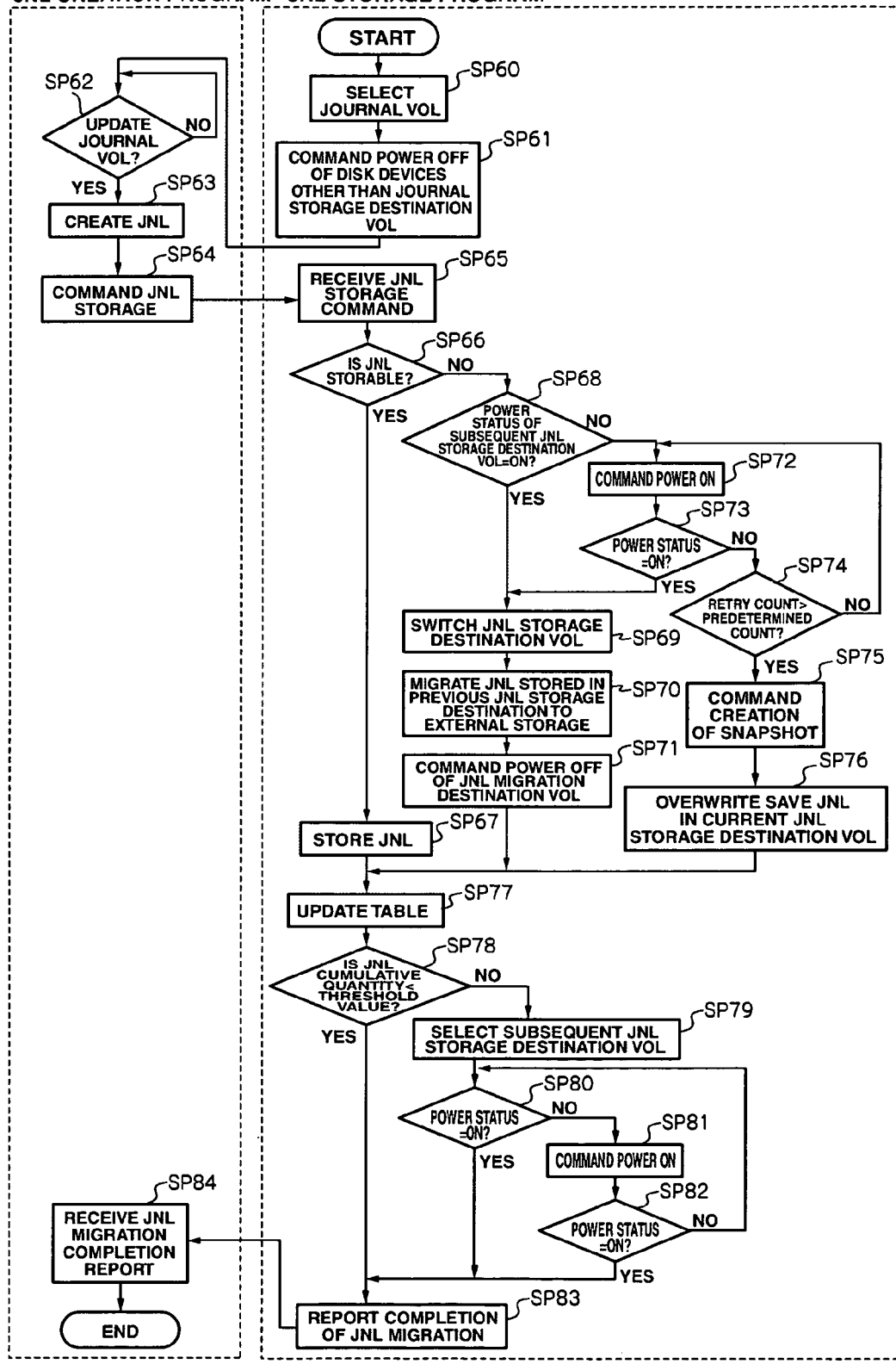
FIG. 13 is a flowchart explaining the external storage power supply control processing according to an embodiment of the present invention.

FIG. 13 is a flowchart showing the processing contents of the channel adapters 13 in the storage apparatus 31 concerning the metadata creation and storage processing including the journal storage processing. In FIG. 13, processing in the section on the left side enclosed with broken lines is performed based on the journal creation program 32A (FIG. 4) configuring the data protection program 32 (FIG. 4 and FIG. 8) according to the third embodiment, whereas processing in the section on the right side enclosed with broken lines is performed based on the journal creation program 32A and data image provision program 19C (FIG. 4) as well as the journal storage program 32B configuring the data protection program 32 (FIG. 4).

The channel adapter 13 processes the data creation and storage processing at step SP60 to step SP66 as with step SP1 to step SP7 of the data creation and storage processing explained with reference to FIG. 6.

When the channel adapter 13 obtains a positive result in the determination at step SP65, it accesses the disk adapter 17 and determines whether the power of the disk device 10 to provide the journal volume candidate of the subsequent journal migration destination volume has been turned on (SP68).

When the channel adapter 13 obtains a positive result in this determination, it switches the journal storage destination to the subsequent journal storage destination volume (SP69). Further, the channel adapter 13 thereafter selects a journal migration destination volume among the journal volumes provided in the external storage apparatus 24 based on the journal volume management table 18, and migrates the journal stored in the previous journal storage destination volume to this journal migration destination volume (SP70).

When the channel adapter 13 completes the migration of this journal, it sends a power-off command to the corresponding external storage apparatus 24 for turning off the power of the disk device 10 to provide the journal migration destination volume (SP71), and thereafter proceeds to step SP77.

In contrast to this, when the channel adapter 13 obtains a negative result in the determination at step SP68, it issues a power-on command to the disk adapter 17 for turning on the power of the disk device 10 to provide the journal volume candidate of the subsequent journal storage destination volume (SP72), and thereafter determines whether the power of the disk device 10 has been turned on based on a response from the disk adapter 17 to such power-on command (SP73).

When the channel adapter 13 obtains a positive result in this determination, it switches the journal storage destination to the subsequent journal storage destination volume. In contrast, when the channel adapter 13 obtains a negative result, it determines whether the retry count exceeds a predetermined count (SP74). When the channel adapter 13 obtains a negative result in this determination, it repeats the processing of step SP72 to step SP74 until the power of the corresponding disk device 10 is turned on; otherwise until the retry count exceeds the predetermined count.

When the retry count eventually exceeds the predetermined count, the channel adapter 13 sends a command to any one of the external storage apparatuses 24 for creating a snapshot of the business volume at such time (hereinafter referred to as a "snapshot creation command") (SP75), thereafter overwrites the journal created at step SP63 on the current journal storage destination volume (SP76), and updates the journal volume management table 18 accordingly.

The channel adapter 13 thereafter processes step SP77 to step SP84 as with step SP12 to step SP20 of the journal creation and storage processing explained with reference to FIG. 6, and thereafter ends this data creation and storage processing.

As described above, in this storage system 30, the journal storage destination volume in the storage apparatus 31 can be reused by utilizing a snapshot. Thus, it is possible to practically deal with the situation sufficiently even if a failure occurs in the journal volume set forth as the subsequent journal storage destination volume in the storage apparatus 31. Accordingly, it is possible to configure a highly reliable storage system.

(4) Fourth Embodiment

With the storage system 20 according to the second embodiment, the power of the disk device 10 to provide the journal migration destination volume is turned on immediately before migrating the journal stored in the journal storage destination volume to the journal migration destination volume, and the power supply of the disk device 10 is immediately turned off at the stage when the migration of such journal is complete. Nevertheless, once the power of the disk device 10 is turned off, a considerable amount of time is required to turn on the power of the disk device 10 so that the disk device 10 will be in a data writable "Ready" state.

In the meanwhile, CDP as the foregoing data protection system includes two systems: Namely, a first data protection system of retaining the data image of the business volume at a certain point in time in the past, and updating the data image up to an arbitrary point in time and recovering the business volume by sequentially overwriting the journal of the update history of the business volume on this data image; and a second data protection system of storing data of the business volume before the update as a journal upon updating the business volume based on the user data from the server data, and rolling back the business volume up to an arbitrary point in time and recovering the business volume by sequentially overwriting the current business volume in order from the latest journal.

With this second data protection, upon recovering the data image of the business volume at a desired point in time, a journal volume is read in order from the journal volume storing the latest journal among the journal volumes provided in the external storage apparatus.

Therefore, when applying the second data protection system to the second storage system 20, by enabling a more direct access to a journal volume storing the latest journal among the journal volumes provided in the external storage apparatus 24, it would be possible to recover the business volume of a designated time more promptly.

Thus, with the storage system 40 (FIG. 8) according to the present embodiment, the foregoing second data protection system is adopted as the data protection system. With this storage system 40, the disk device 10 to provide the journal migration destination volume is changed to a power saving mode at the stage when the migration of the journal stored in the journal storage destination volume to the journal migration destination volume is complete. It would be understood that a power saving mode, for instance, is an operation mode of being able to immediately return to the "Ready" status while reducing the electricity consumption in comparison to a normal "Ready" status by reducing the rotating speed of the disk. Thereafter, in the storage apparatus 24, the power of the disk device 10 to provide the journal volume in the power saving mode is turned off at the stage when the journal storage destination is switched to the subsequent journal storage destination volume.

Figure 14A:
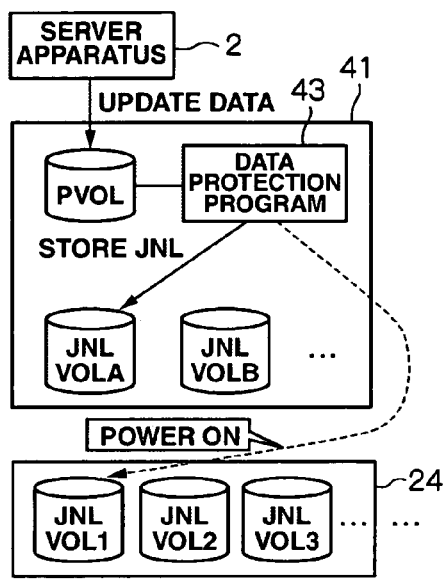
FIGS. 14A to 14D are conceptual diagrams explaining the data creation and storage processing according to an embodiment of the present invention.

For example, as shown in FIG. 14A, a journal volume 1 and a journal volume 2 are provided in a storage apparatus 41 according to the present embodiment. Further, the journal volume 1 and journal volume 2 are sequentially and alternately used as the journal storage destination volume. Furthermore, provided in the external storage apparatus 24 are journal volume A, journal volume B, journal volume C, . . . , which are used in this order as the journal migration destination volume.

In this case, at the outset, when the journal storage quantity of the journal volume 1 configured in the journal storage destination volume reaches the threshold value, when the power of the disk device 10 to provide the journal volume A in the external storage apparatus 24 is turned on.

Figure 14B:
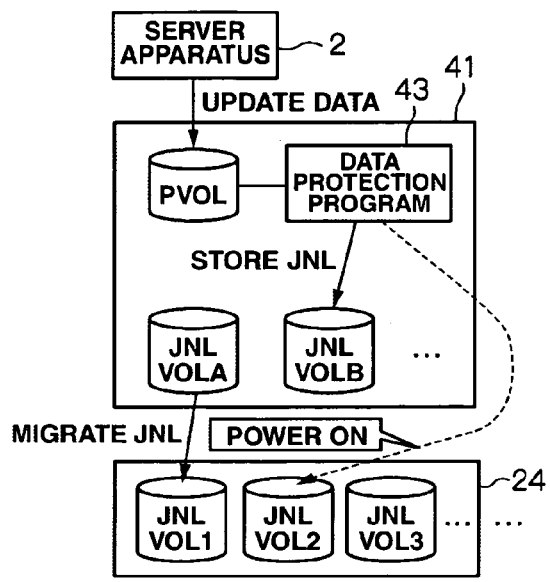

Further, as shown in FIG. 14B, at the stage when the journal storage destination is thereafter switched to the journal volume 2 as the subsequent journal storage destination volume, the journals accumulated in the journal volume 1 as the previous journal storage destination volume are migrated to the journal volume A. Further, at the stage when the journal storage quantity of the journal volume 2 as the current journal storage destination volume reaches the threshold value, power of the disk device 10 to provide the journal volume B as the subsequent journal migration destination volume is turned on.

Figure 14C:
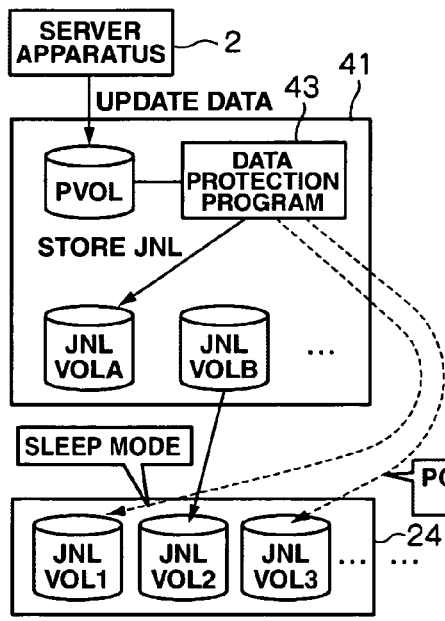

Thereafter, as shown in FIG. 14C, at the stage when the migration of journals from the journal volume 1 to the journal volume A is complete, a status of the disk device 10 to provide the journal volume A is changed to the power saving mode Further, at the stage when the journal storage destination volume is once again switched to the journal volume 1, journals stored in the journal volume 2 as the previous journal storage destination volume are migrated to the journal volume B as the current journal migration volume. Furthermore, at the stage when the journal storage quantity of the journal volume 2 as the current journal storage destination volume reaches the threshold value, the power of the disk device 10 to provide the journal volume C as the subsequent journal migration destination volume is turned on.

Figure 14D:
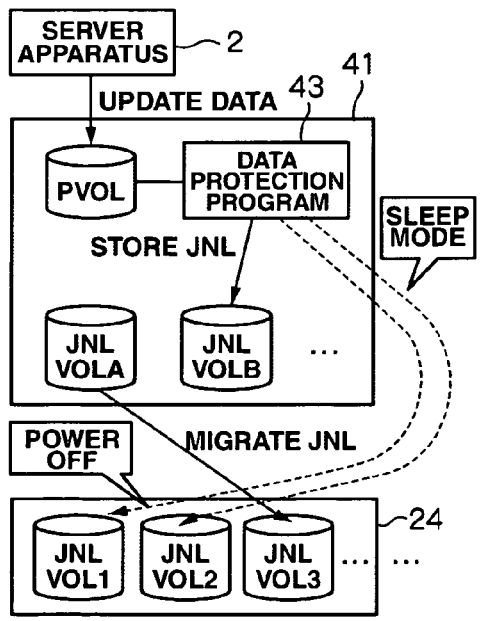

Then, as shown in FIG. 14D, at the stage when the migration of journals from the journal volume 2 to the journal volume B is complete, the status of the disk device 10 to provide the journal volume B is changed to the power saving mode, and, in parallel with this, the disk device 10 to provide the journal volume A as the journal migration destination volume immediately preceding the journal volume B is turned off.

Thereafter, at the stage when the journal storage quantity in the journal volume 1 as the journal storage destination volume reaches the threshold value, power of the disk device 10 to provide the journal volume C to become the subsequent journal migration destination volume is turned on. Further, at the stage when the journal storage destination is thereafter switched to the journal volume 2, journals stored in the journal volume 1 as the previous journal storage destination volume are migrated to the journal volume C. The processing steps explained with reference to FIG. 14C and FIG. 14D are thereafter repeated.

With this storage system 40, by way of controlling the power supply of the external storage apparatus 24 as described above, it is possible to seek the reduction in power consumption while promptly recovering the business volume at a desired point in time.

Figure 15:
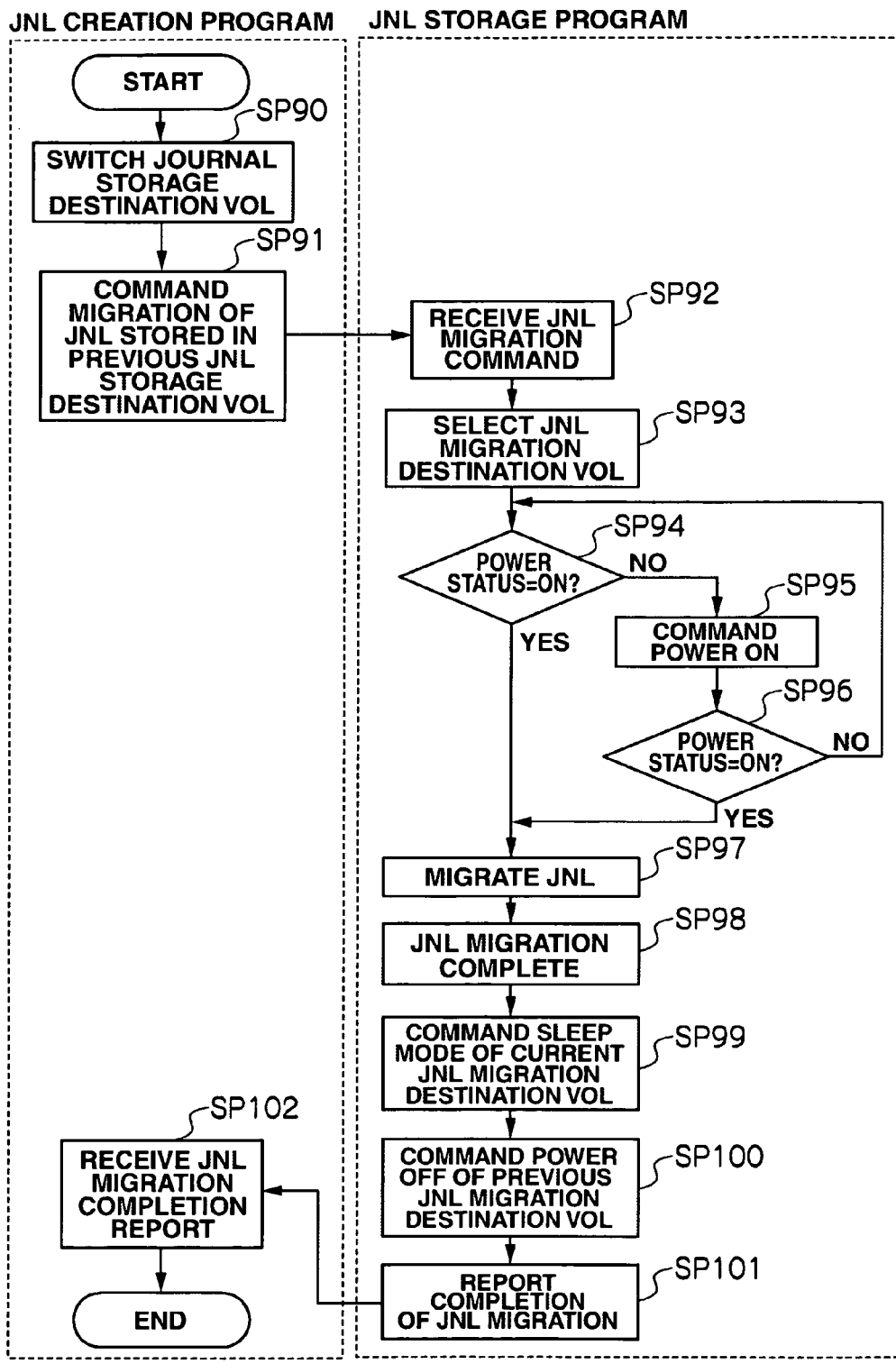
FIG. 15 is a flowchart explaining the external storage power supply control processing according to an embodiment of the present invention.

FIG. 15 is a flowchart showing the processing contents of the channel adapter 13 in the storage apparatus 40 concerning the power supply control of this kind of external storage apparatus 24. In FIG. 15, processing in the section on the left side enclosed with broken lines is performed based on the journal creation program 42A (FIG. 4) configuring the data protection program 42 (FIG. 4 and FIG. 8) according to the fourth embodiment, whereas processing in the section on the right side enclosed with broken lines is performed based on the journal creation program 42A and the data image provision program 19C (FIG. 4) as well as the journal storage program 42B (FIG. 4) configuring the data protection program 32.

The channel adapter 13 of the storage apparatus 41 performs step SP90 to step SP97 of the data creation and storage processing as with step SP40 to step SP47 of the external storage power supply control processing explained with reference to FIG. 10.

When the channel adapter 13 thereafter confirms that the migration of journals from the journal storage destination volume to the journal migration destination volume is complete (SP98), it issues a command to the external storage apparatus 24 provided with the journal migration destination volume for changing the status of the disk device 10 to provide the journal migration destination volume to the power saving mode ("power saving mode transition command") (SP99).

Further, the channel adapter 13 issues a power-off command to the external storage apparatus 24 provided with the journal migration destination volume for turning off the power of the disk drive 10 to provide the immediately preceding journal migration destination volume in the power saving mode (SP100).

Then, the channel adapter 13 thereafter processes step SP101 and step SP102 as with the step SP49 and step SP50 of the external storage power supply control processing explained with reference to FIG. 10, and thereafter ends this external storage power supply control processing.

As described above, the power of the external storage apparatus is turned on based on the journal storage quantity of the journal storage destination volume, and the power saving mode and turning off the power are controlled in three stages. Thus, it is possible to seek the reduction in power consumption while promptly recovering the business volume at a desired point in time.

(5) Other Embodiments

In the first to fifth embodiments as described above, although a disk device is adopted as the storage device to provide the journal volume, the present invention is not limited thereto. For instance, a storage device other than a disk device such as a semiconductor memory may also be adopted.

Further, in the first embodiment described above, although the journal storage destination is the journal volume in the storage apparatus 4, the present invention is not limited thereto. The present invention permits the journal storage destination to be an external storage apparatus. In this case, the power supply control of the external storage apparatus or device may be performed according to the journal storage quantity of the external storage apparatus or the disk device to provide the journal volume in the external storage apparatus.

Likewise, in the second to fourth embodiments described above, although the power supply control of the external storage apparatus 24 is performed in units of the disk devices 10 to provide the journal volume, the present invention is not limited thereto. For instance, by way of using the power supply control method of the external storage apparatus 24 employed in the second to fourth embodiments, the power supply of the overall apparatus of the external storage apparatus 24 may be turned on and off.

In the first to fourth embodiments described above, although the power of the disk devices 10 to provide a journal volume other than the journal storage destination volume or journal migration destination volume at the initial stage is uniformly turned off, the present invention is not limited thereto. For instance, the power of a disk device 10 or external storage apparatus 24 to provide a journal volume that is not expected to be accessed for a while may be turned off.

In this case, in order to predict access, the present invention may adopt a method of using as the criterion of judgment the oldness of the journal retained by the journal volume or external storage apparatus 24 (e.g., it is deemed that the oldest journal data would not be accessed for a while). A method may use a criterion as to whether any journal data that is no longer required due to the acquisition of a snapshot is retained. Alternatively, a method may use a criterion as to whether the journal volume is provided with the same RAID group as the RAID group providing the current journal storage destination volume or journal migration destination volume.

Further, in the first to fourth embodiments described above, as a method of selecting the subsequent journal storage destination volume or journal migration destination volume, although a method of selecting from the smallest entry number to the journal volume management table 18 is adopted, the present invention is not limited thereto. Various other selection methods may be widely adopted. For example, a method of giving preference to a journal volume provided by a high-performance disk device 10, whether the current key journal data is retained, and giving preference to the journal volume provided with the same RAID group as the RAID group in which the journal volume is providing the current journal storage destination volume or journal migration destination volume may be employed.

Further, in the third embodiment explained above, although, in a case when the journal storage destination could not be switched to the subsequent journal storage destination volume, a snapshot of the business volume at such point in time is created, the present invention is not limited thereto. For instance, a snapshot of the journal storage destination volume may be constantly created or the creation of such snapshot may be constantly commanded upon switching the journal storage destination to the subsequent journal storage destination volume or subsequent external storage apparatus 24. Alternatively, a snapshot of the journal storage destination volume may be constantly created or the creation of such snapshot may be constantly commanded when the journal storage quantity exceeds the predetermined threshold value set to the journal storage destination volume or external storage apparatus.

What is claimed is:

1. A storage system comprising:
a host system which serves as an upper-level system; and a storage apparatus operatively connected to said host system and configured to provide a first volume for reading and writing data from and to said host system, wherein said storage apparatus comprises:
a journal creation unit configured to create a journal as update history information of said first volume; and
a journal storage unit configured to store said journal created by said journal creation unit selectively in one of second volumes or one of first external storage apparatuses, each of which serves as a storage destination of said journal, wherein said journal storage unit executes power supply control of a storage apparatus providing an alternate second volume as the storage destination of the journal or an alternate first external storage apparatus as the storage destination of the journal according to the storage quantity of said journal in said one of second volumes or said one of first external storage apparatuses.

2. The storage system according to claim 1, wherein said journal storage unit executes power supply control of a previous second volume or a previous first external storage apparatus as a storage destination of the journal according to alteration of the storage destination of said journal to the alternate second volume or the alternate first external storage apparatus.

3. The storage system according to claim 1, wherein said journal storage unit executes power supply control of said storage device providing an alternate second volume as the storage destination of the journal or an alternate first external storage as the storage destination of the journal when the storage quantity of said journal in said one of second volumes or said one of first external storage apparatuses exceeds a predetermined threshold value set to said one of second volumes or said one of first external storage apparatuses.

4. The storage system according to claim 2, wherein said journal storage unit migrates said journal stored in said one of second volumes to a second external storage apparatus, and controls the power supply of said second external storage apparatus or a storage device disposed in said second external storage apparatus and configured to provide a third volume which serves as the migration destination of said journal according to the alteration of the storage destination of said journal.

5. The storage system according to claim 1, wherein said journal storage unit creates a snapshot formed from a data image of said first volume or commands the creation of said snapshot in accordance with the alteration of the storage destination of said journal to the alternate second volume or alternate storage apparatus.

6. A method of controlling power supply of a storage system having a host system which serves as an upper-level system, and a storage apparatus providing a first volume for reading and writing data from and to said host system, comprising:
creating a journal regarding update history information of said first volume; and
storing the created journal selectively in one of second volumes or one of first external storage apparatuses, each of which serves as a storage destination of said journal,
wherein, at said second step, power supply control of said storage apparatus providing an alternate second volume as the storage destination of the journal or an alternate first external storage apparatus as the storage destination of the journal is executed according to the storage quantity of said journal in said one of second volumes or said one of first external storage apparatuses.

7. The method according to claim 6, wherein, at said second step, power supply control of said previous second volume or said previous first external storage apparatus as the storage destination of the journal is executed according to the alteration of the storage destination of said journal to the alternate second volume or the alternate first external storage apparatus.

8. The method according to claim 6, wherein, at said storing step, power supply control of said storage device providing said alternate second volume as the storage destination of the journal or said alternate first external storage as the storage destination of the journal is executed when the storage quantity of said journal in said one of second volumes or said one of first external storage apparatuses exceeds a predetermined threshold value set to said second volume or said first external storage apparatus.

9. The method according to claim 6, wherein, at said storing step, said journal stored in said second volume is migrated to a second external storage apparatus, and power supply of said second external storage apparatus or a storage device disposed in said second external storage apparatus and configured to provide a third volume which serves as the migration destination of said journal is controlled according to the alternation of the storage destination of said journal on the other hand.

10. The method according to claim 6, wherein, at said storing step, a snapshot formed from a data image of said first volume is created or the creation of said snapshot is commanded upon the alternation of the storage destination of said journal to the alternate second volume or the alternate storage apparatus.

11. A storage apparatus providing a first volume for reading and writing data from and to a host system which serves as an upper-level system, comprising:
 a journal creation unit configured to create a journal as update history information of said first volume; and
 a journal storage unit configured to store said journal created with said journal creation unit in one of second volumes or one of first external storage apparatuses, each of which serves as a storage destination of said journal, wherein said journal storage unit executes power supply control of said storage apparatus providing an alternate second volume as the storage destination of the journal or an alternate first external storage apparatus as the storage destination of the journal according to the storage quantity of said journal in said one of second volumes or said one of first external storage apparatuses.

12. The storage apparatus according to claim 11, wherein said journal storage unit executes power supply control of said previous second volume or said previous first external storage apparatus as the storage destination of the journal according to the alternation of the storage destination of said journal to the alternate second volume or the alternate first external storage apparatus.

13. The storage apparatus according to claim 11, wherein said journal storage unit executes power supply control of said storage device providing said alternate second volume as the storage destination of the journal or said alternate first external storage as the storage destination of the journal when the storage quantity of said journal in said one of second volumes or said one of first external storage apparatuses exceeds a predetermined threshold value set to said second volume or said first external storage apparatus.

14. The storage apparatus according to claim 12, wherein said journal storage unit migrates said journal stored in said one of second volumes to a second external storage apparatus, and controls the power supply of said second external storage apparatus or a storage device disposed in said second external storage apparatus and configured to provide a third volume which serves as the migration destination of said journal according to the alternation of the storage destination of said journal.

15. The storage apparatus according to claim 11, wherein said journal storage unit creates a snapshot formed from a data image of said first volume or commands the creation of said snapshot upon the alternation of the storage destination of said journal to the alternate second volume or alternate storage apparatus.

16. A method of processing data in a storage system having a host system which serves as an upper-level system, and a storage apparatus providing a first volume for reading and writing data from and to said host system, comprising:
 creating a journal as update history information of said first volume; and
 storing the created journal in one of second volumes or one of first external storage apparatuses, each of which serves as a storage destination of said journal, wherein, at said storing step, said journal stored in said one of second volumes is migrated to a third volume or a second external storage apparatus according to the alternation of the storage destination of said journal to the alternate second volume or the alternate first external storage apparatus.

17. A storage system comprising:
 a host system which serves as an upper-level system; and
 a storage apparatus configured to provide a first volume for reading and writing data from and to said host system, wherein said storage apparatus comprises:
 a journal creation unit configured to create a journal as update history information of said first volume; and
 a journal storage unit configured to store said journal created by said journal creation unit selectively in one of second volumes or one of first external storage apparatuses, each of which serves as a storage destination of said journal, wherein said journal storage unit creates a snapshot formed from a data image of said first volume or commands the creation of said snapshot upon the alternation of the storage destination of said journal to the alternate second volume or alternate external storage apparatus.

18. A storage system comprising:
 a host system which serves as an upper-level system; and
 a storage apparatus configured to provide a first volume for reading and writing data from and to said host system, wherein said storage apparatus comprises:
 a journal creation unit configured to create a journal as update history information of said first volume; and
 a journal storage unit configured to store said journal created with said journal creation unit in one of second volumes or one of first external storage apparatuses configured as a storage destination of said journal, wherein said journal storage unit creates a snapshot formed from a data image of said first volume or commands the creation of said snapshot when the storage quantity of said journal exceeds a predetermined threshold value set to said one of second volumes or said one of first external storage apparatuses.

* * * * *